(12) United States Patent
Asami

(10) Patent No.: US 8,144,405 B2
(45) Date of Patent: Mar. 27, 2012

(54) IMAGING LENS AND IMAGING APPARATUS

(75) Inventor: Taro Asami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 159 days.

(21) Appl. No.: 12/757,847

(22) Filed: Apr. 9, 2010

(65) Prior Publication Data

US 2010/0259835 A1  Oct. 14, 2010

(30) Foreign Application Priority Data

Apr. 10, 2009  (JP) ................... P2009-095569
Aug. 19, 2009  (JP) ................... P2009-189939
Mar. 29, 2010  (JP) ................... P2010-074958

(51) Int. Cl.
G02B 13/04 (2006.01)
G02B 13/18 (2006.01)
H04N 5/225 (2006.01)

(52) U.S. Cl. .............. 359/753; 359/715; 348/340

(58) Field of Classification Search ............ 348/340; 359/715, 749, 753, 771, 781
See application file for complete search history.

(56) References Cited

U.S. PATENT DOCUMENTS

| 7,518,809 | B2 * | 4/2009 | Yamakawa et al. | 359/753 |
| 7,957,074 | B2 * | 6/2011 | Asami | 359/713 |
| 2006/0187557 | A1 | 8/2006 | Yamakawa | |
| 2007/0183062 | A1 | 8/2007 | Nakamura | |
| 2011/0122512 | A1 * | 5/2011 | Asami | 359/753 |

FOREIGN PATENT DOCUMENTS

| JP | 2005-227426 A | 8/2005 |
| JP | 2006-259704 A | 9/2006 |
| JP | 2007-206516 A | 8/2007 |
| JP | 2007-264676 A | 10/2007 |

* cited by examiner

Primary Examiner — David N Spector
(74) Attorney, Agent, or Firm — Birch, Stewart, Kolasch & Birch, LLP

(57) ABSTRACT

An imaging lens is provided and includes: in order from the object side, a negative first lens, a negative second lens, a positive third lens, a stop, and a positive fourth lens. In the lens, each of the second lens, the third lens, and the fourth lens has at least one aspheric surface, and an Abbe number of a material of the third lens at the d-line is 35 or less. In addition, the imaging lens satisfies the following Conditional Expression (1):

$$-0.2 < (R3+R4)/(R3-R4) < 0.2 \quad (1)$$

where R3 is a paraxial radius of curvature of the object side surface of the second lens, and R4 is a paraxial radius of curvature of the image side surface of the second lens.

32 Claims, 11 Drawing Sheets

FIG. 3    EXAMPLE 1
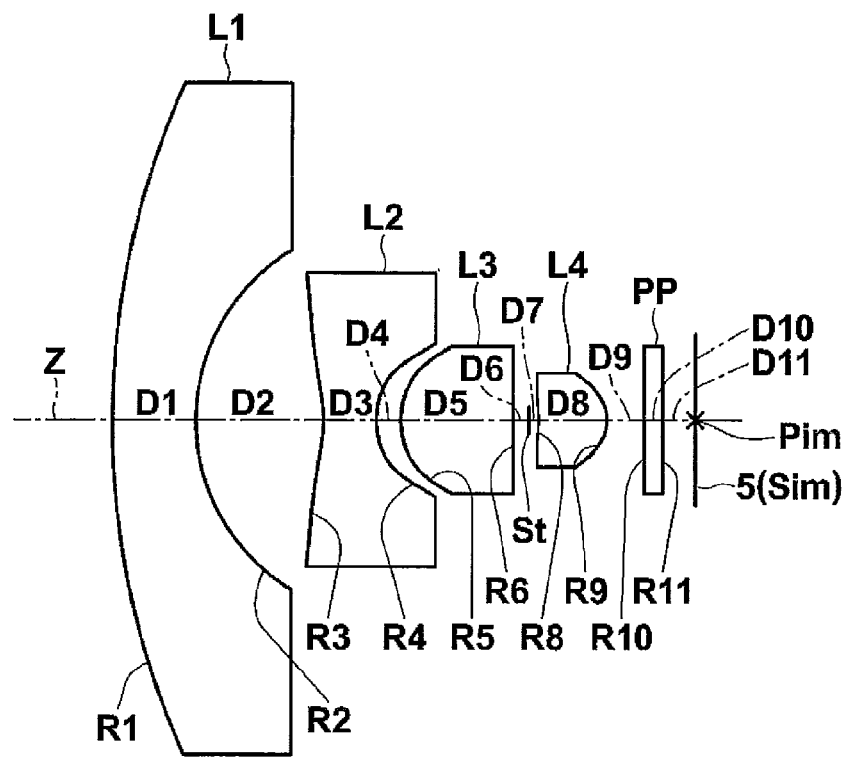
FIG. 4    EXAMPLE 2
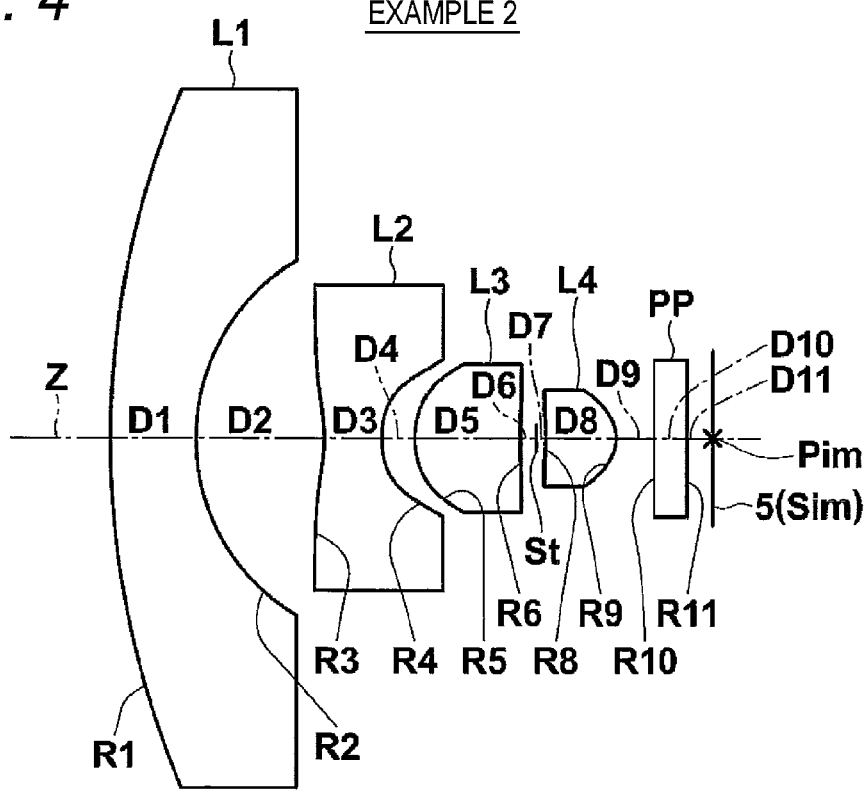

FIG. 5     EXAMPLE 3
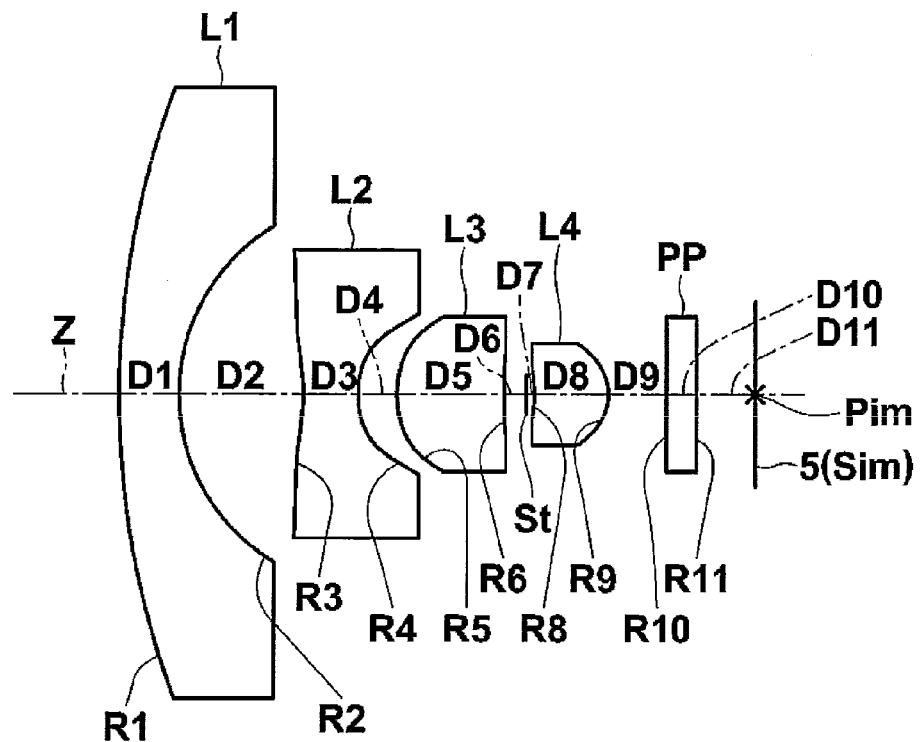
FIG. 6     EXAMPLE 4
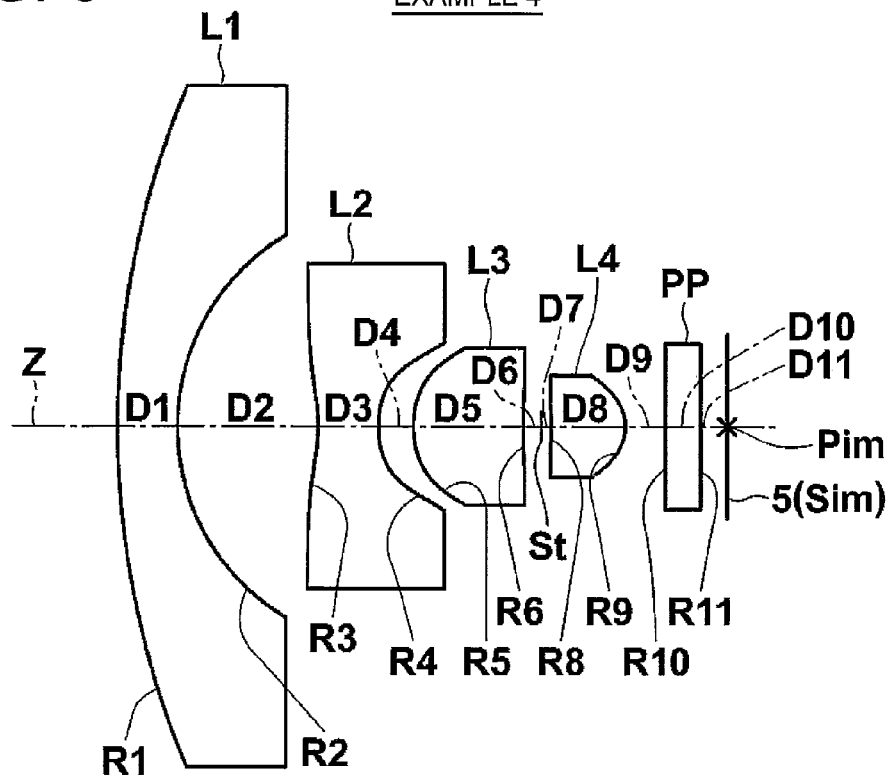

EXAMPLE 5

FIG. 8
EXAMPLE 1
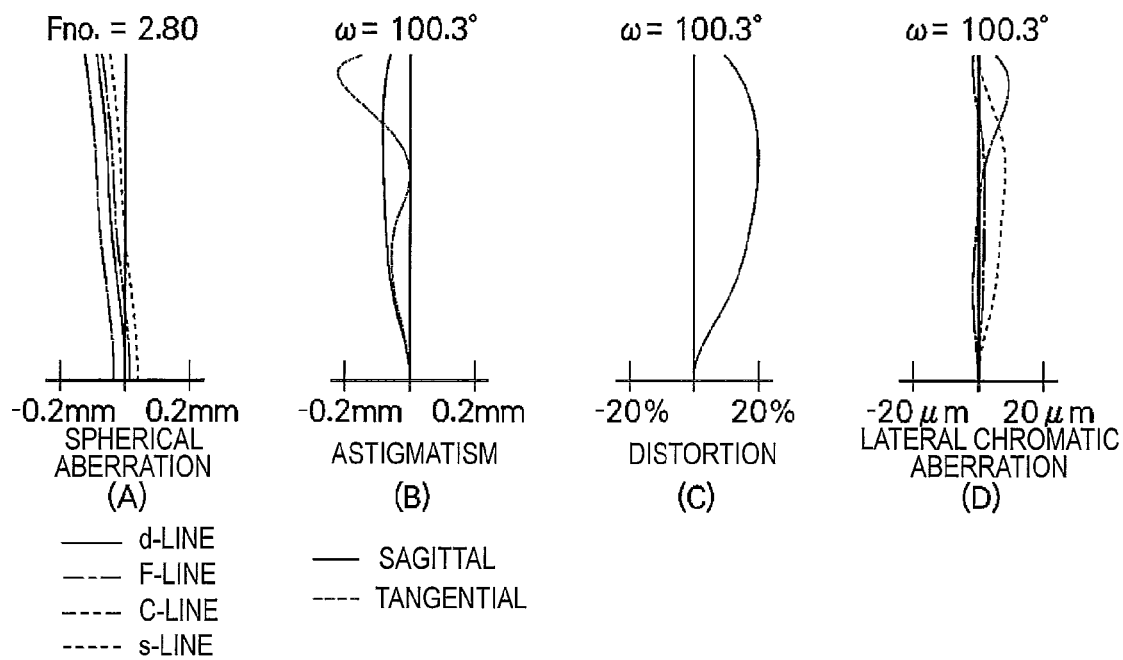
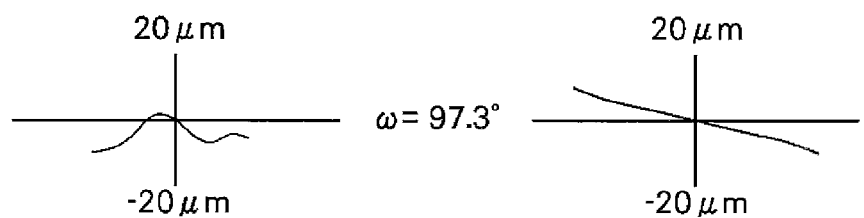
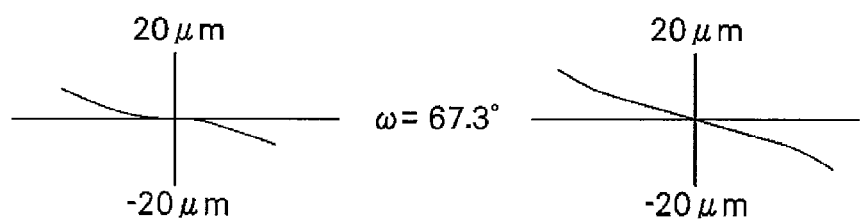
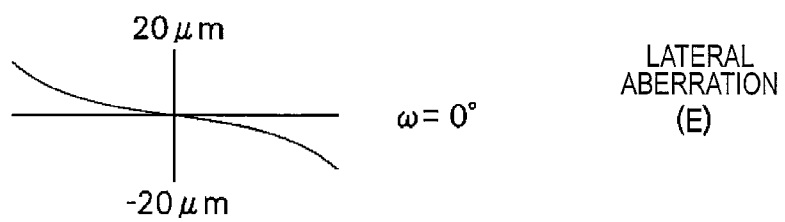

FIG. 9
EXAMPLE 2
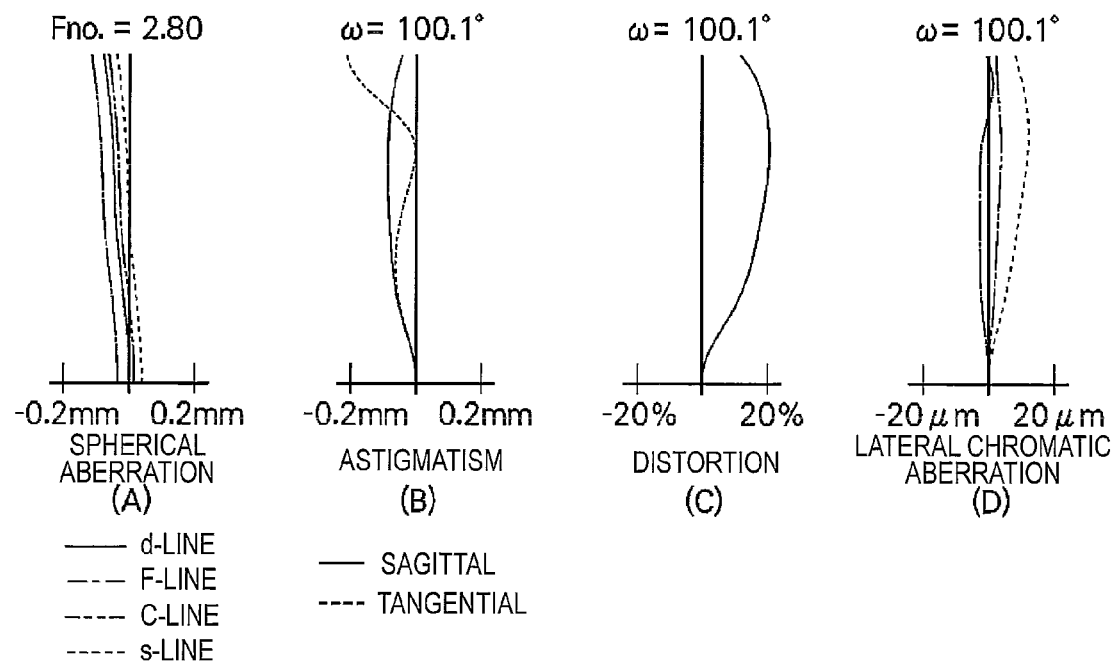
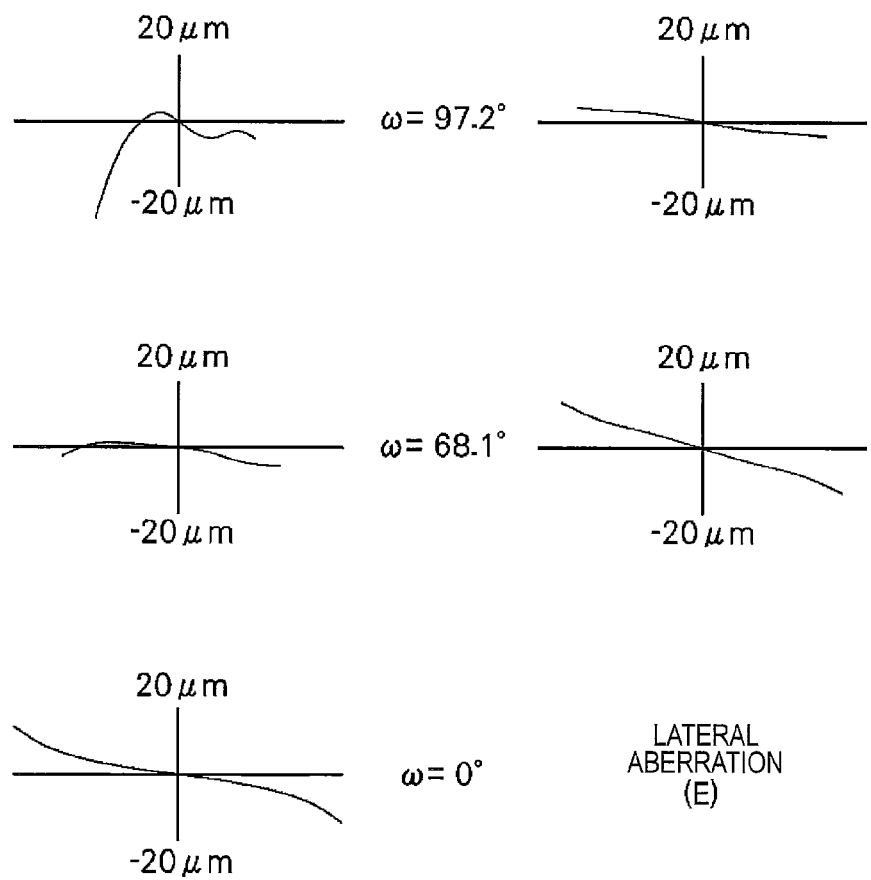

FIG. 10
EXAMPLE 3
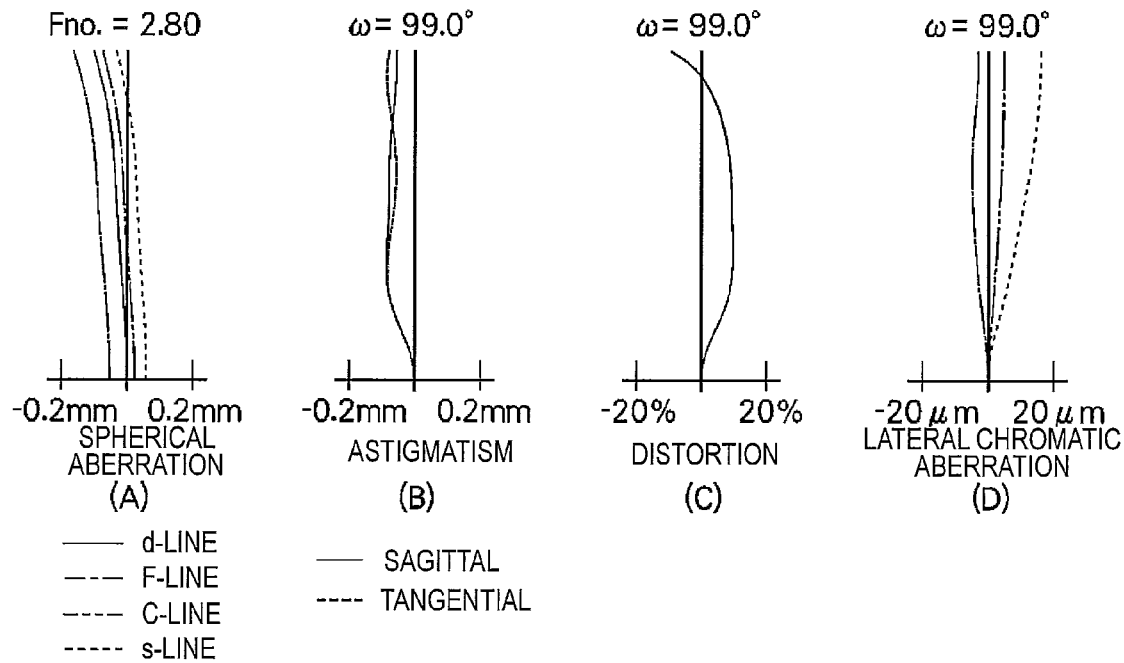
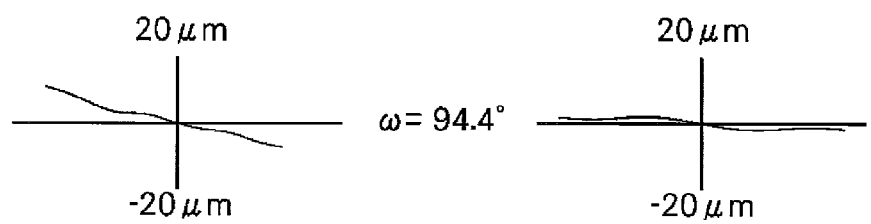
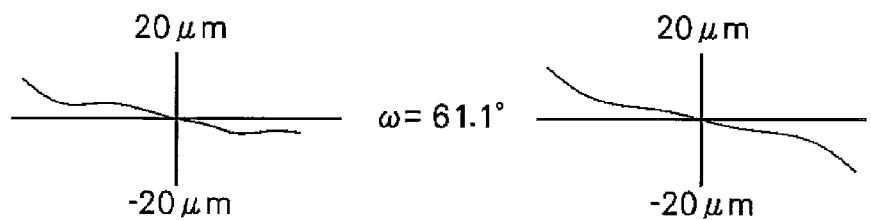
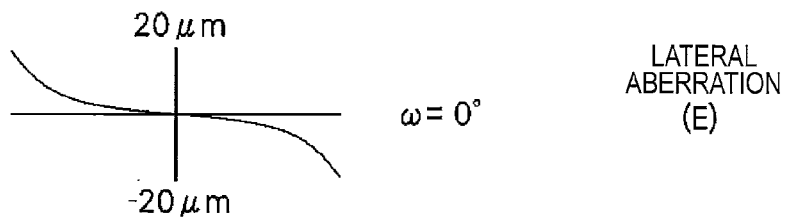

FIG. 11
EXAMPLE 4
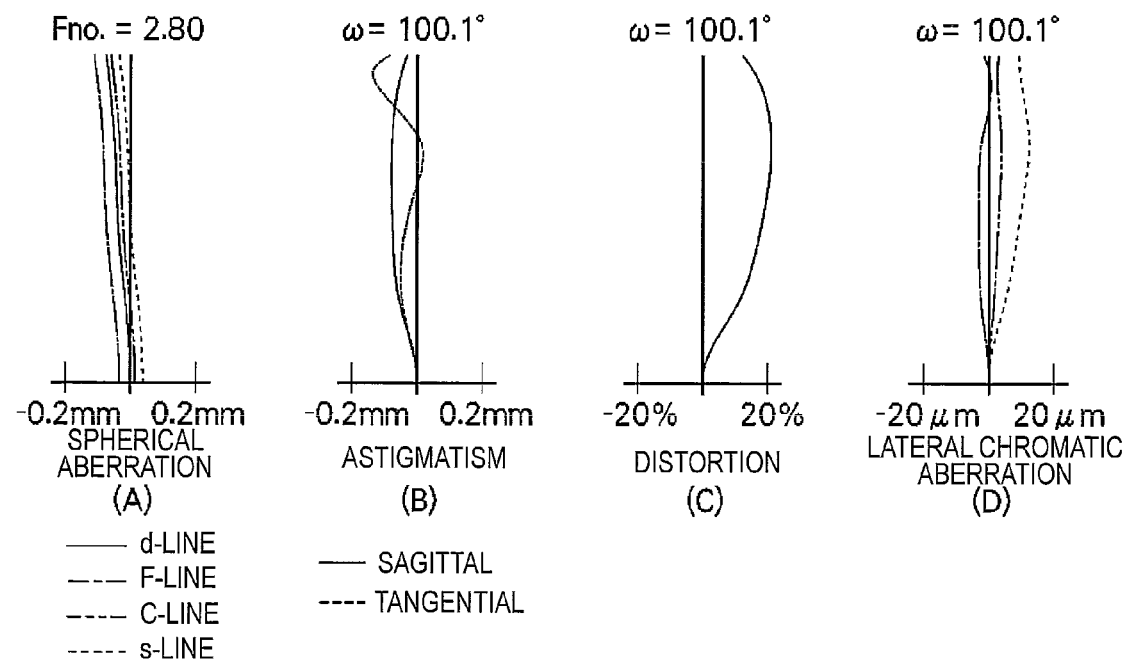
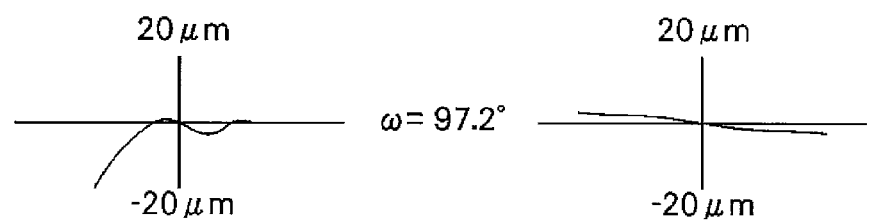
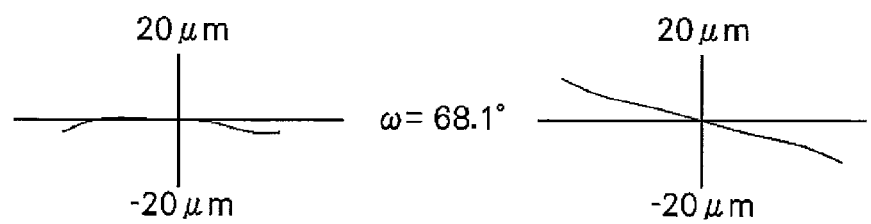
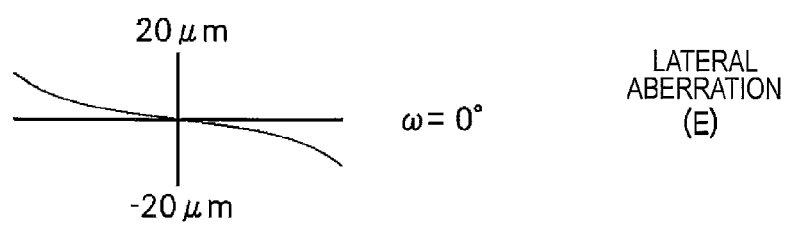

FIG. 12
EXAMPLE 5
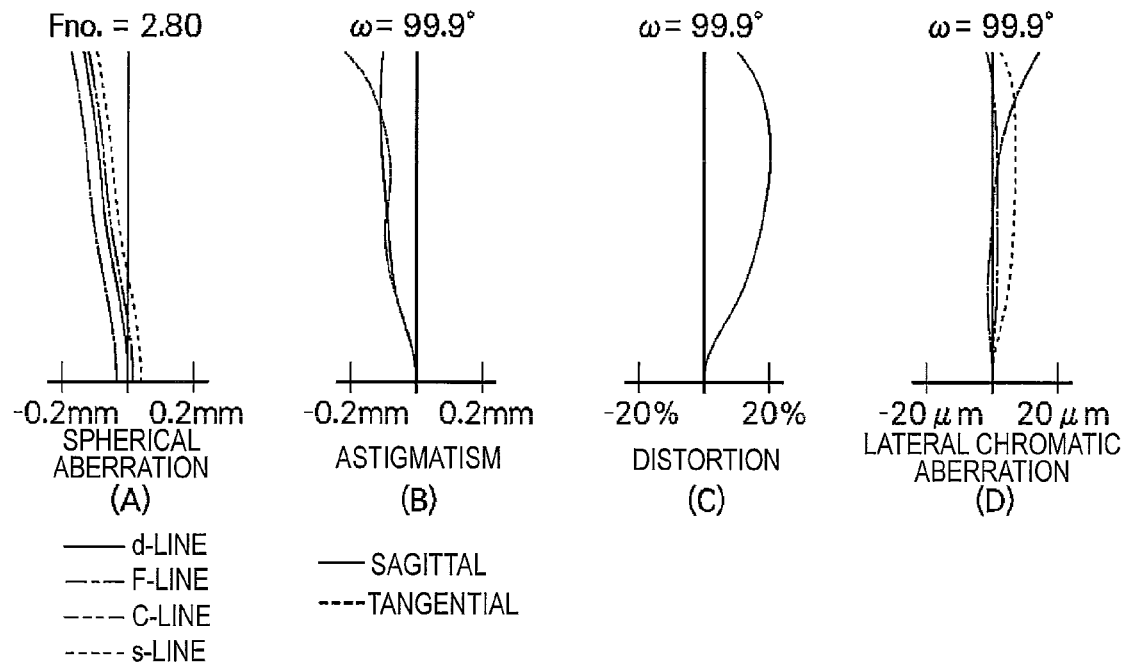
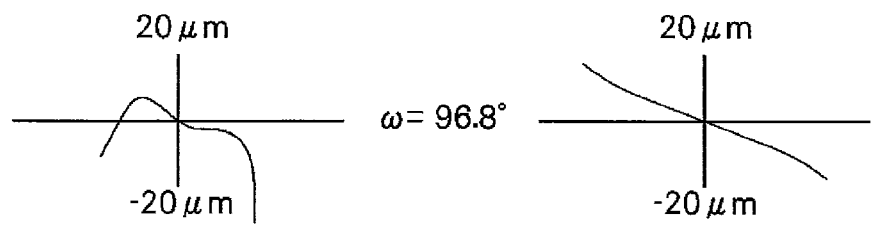
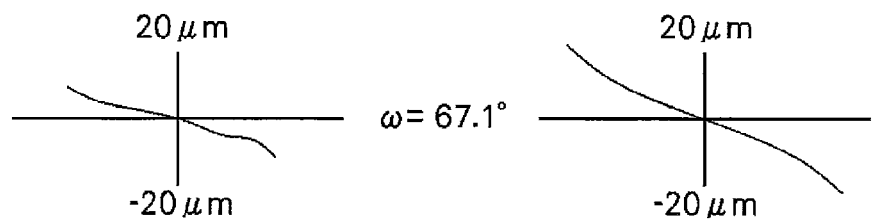
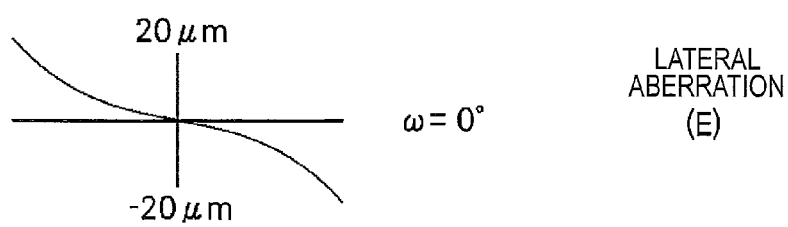

IMAGING LENS AND IMAGING APPARATUS

This application is based on and claims priority under 35 U.S.C §119 from Japanese Patent Application Nos. 2009-095569, 2009-189939, and 2010-074958 filed on April 10, Aug. 19, 2009, and Mar. 29, 2010, respectively, the entire disclosures of which are herein incorporated by reference.

BACKGROUND OF THE INVENTION

1. Field of the Invention

The present invention relates to an imaging lens and an imaging apparatus, more particularly, to an imaging lens suitable to be used in a surveillance camera, a cell phone camera, an on-board camera, and the like employing an imaging device such as a CCD (Charge Coupled Device) and a CMOS (Complementary Metal Oxide Semiconductor), and an imaging apparatus having the imaging lens.

2. Description of Related Art

Recently, imaging devices such as CCD and CMOS have been to a great extent miniaturized and the number of pixels of those excessively increased. In addition, an imaging apparatus main body having the imaging device has also been miniaturized, and thus it is also required not only to achieve favorable optical performance but also to achieve weight reduction and miniaturization of an imaging lens mounted therein. On the other hand, it is required for on-board cameras, surveillance cameras, and the like to have, for example, a wide angle lens, of which a total angle of view is larger than 180 degrees, with high antiweatherability, a small size, and high performance.

In this field, known imaging lenses having a relatively small number of lenses include, for example, the lenses disclosed in JP-A-2007-264676, JP-A-2005-227426, JP-A-2006-259704, and JP-A-2007-206516. These documents disclose imaging lenses formed of four elements including an aspheric lens.

SUMMARY OF THE INVENTION

As it is, the requirements for imaging lenses mounted onto on-board cameras or surveillance cameras become higher year by year. Accordingly, it has been a requirement for imaging lenses to have a small size, satisfy a wide angle of which the total angle of view is larger than 180 degrees, and be able to obtain a fine image even in the peripheral portion of the imaging area. However, in the known small-sized lens, it is difficult simultaneously to achieve the wide angle of which the total angle of view is larger than 180 degrees and obtain a fine image even in the peripheral portion of the imaging area.

An object of the invention is to provide an imaging lens capable of achieving a wide angle of which the total angle of view is larger than 180 degrees, achieving a small size, exhibiting a favorable optical performance, and obtaining a fine image even in the peripheral portion of the imaging area. In addition, another object of the invention is to provide an imaging apparatus having the imaging lens.

According to a first aspect of the invention, there is provided a first imaging lens including: in order from an object side thereof: a negative first lens; a negative second lens; a positive third lens; an aperture diaphragm; and a positive fourth lens. Each of the second lens, the third lens, and the fourth lens has at least one aspheric surface, and an Abbe number of a material of the third lens at the d-line is 35 or less. In addition, the imaging lens satisfies the following Conditional Expression (1):

$$-0.2<(R3+R4)/(R3-R4)<0.2 \tag{1}$$

where R3 is a paraxial radius of curvature of an object side surface of the second lens, and R4 is a paraxial radius of curvature of an image side surface of the second lens.

According to a second aspect of the invention, there is provided a second imaging lens including: in order from an object side thereof, a negative first lens which has a meniscus shape concave toward the image side; a second lens of which an object side surface and an image side surface are aspheric; a positive third lens of which an object side surface is aspheric; an aperture diaphragm; and a positive fourth lens of which an image side surface is aspheric. An Abbe number of a material of the third lens at the d-line is 35 or less. In addition, the imaging lens satisfies the following Conditional Expression (2):

$$1.0<D3/f<5.0 \tag{2}$$

where D3 is a center thickness of the second lens, and f is a focal length of the whole system.

According to a third aspect of the invention, there is provided a third imaging lens includes: in order from an object side thereof, a negative first lens; a negative second lens; a positive third lens; an aperture diaphragm; and a positive fourth lens. A center thickness of the first lens is 1.7 mm or more. In addition, the imaging lens satisfies the following Conditional Expression (3):

$$2.5<D1/f<5.5 \tag{3}$$

where D1 is the center thickness of the first lens, and f is a focal length of the whole system.

According to a fourth aspect of the invention, there is provided a fourth imaging lens includes: in order from an object side thereof, a negative first lens; a negative second lens; a positive third lens; an aperture diaphragm; and a positive fourth lens. A center thickness of the first lens is 1.7 mm or more. In addition, the imaging lens satisfies the following Conditional Expression (4):

$$0.5<ED1/R1<0.95 \tag{4}$$

where ED1 is an effective diameter of an object side surface of the first lens, and R1 is a radius of curvature of the object side surface of the first lens.

Further, it is preferable that the first to fourth imaging lenses according to the aspects of the invention should satisfy the following Conditional Expressions (5) to (10). Furthermore, the preferred configuration may be any one of the configurations based on the following Conditional Expressions (5) to (10), or may be a combination of two or more configurations selected optionally.

$$2.0<D2/f<5.0 \tag{5}$$

$$0.01<|f12/f34|<0.5 \tag{6}$$

$$2.5<(D4+D5)/f<5.5 \tag{7}$$

$$10.0<L/f<20.0 \tag{8}$$

$$1.5<Bf/f<4.0 \tag{9}$$

$$0.3<(R8-R9)/(R8+R9)<1.0 \tag{10}$$

where f is the focal length of the whole system,

D2 is an air space on an optical axis between the first lens and the second lens, f12 is a composite focal length of the first lens and the second lens, f34 is a composite focal length of the third lens and the fourth lens, D4 is an air space on the optical axis between the second lens and the third lens, D5 is a center thickness of the third lens, L is a distance on the optical axis from the object side surface of the first lens to an image plane (a back focal length is an air-conversion length), Bf is a distance on the optical axis from the image side surface of the fourth lens to the image plane (an air-conversion length), R8 is a paraxial radius of curvature of an object side surface of the fourth lens, and R9 is a paraxial radius of curvature of the image side surface of the fourth lens.

Furthermore, the "concave surface" and the "meniscus shape" of the first lens of the second imaging lens according to the aspect of the invention are considered in the paraxial region when those are aspheric. Further, R1 of the fourth imaging lens according to the aspect of the invention is assumed as a paraxial radius of curvature when the object side surface of the first lens is aspheric. In the embodiments of the invention, the sign of the power of the aspheric lens is considered in the paraxial region. It is assumed that the sign of the radius of curvature and the sign of the paraxial radius of curvature are positive when a lens is convex toward the object side, and are negative when the lens is convex toward the image side.

Further, "an effective diameter of a surface" is defined as a diameter of a circle formed of radially outermost points (the points farthest from the optical axis) of the intersection points between the lens surface and all the rays contributed to the image formation. In addition, the "effective diameter edge" is defined as the outermost points. Furthermore, in a system which is rotationally symmetric about the optical axis, a shape formed of the outermost points is circular. However, in a system which is not rotationally symmetric about the optical axis, the shape may be not circular. In this case, a circle equivalent to the shape is assumed, and the diameter of the circle may be defined as an effective diameter.

According to a fifth aspect of the invention, the imaging apparatus includes at least any one of the first to fourth imaging lenses according to the aspects of the invention.

The first imaging lens according to the first aspect of the invention has at least four lens elements. In the lens, an aspheric surface is provided on each lens of the second to fourth lenses, and the configurations of power arrangement in the whole system, the position of the aperture diaphragm, the material of the third lens, and the like are appropriately set, thereby satisfying Conditional Expression (1). Hence, it is possible to embody an imaging lens which has a small size and has high optical performance capable of achieving the wide angle of which the total angle of view is larger than 180 degrees and obtaining a fine image even in the peripheral portion of the imaging area by satisfactorily correcting field curvature, distortion, and lateral chromatic aberration.

The second imaging lens according to the second aspect of the invention has at least four lens elements. In the lens, an aspheric surface is effectively provided on each lens of the second to fourth lenses, and the configurations of the surface shape and the power of each lens, the position of the aperture diaphragm, the material of the third lens, and the like are appropriately set, thereby satisfying Conditional Expression (2). Hence, it is possible to embody an imaging lens which has a small size and has high optical performance capable of achieving the wide angle of which the total angle of view is larger than 180 degrees and obtaining a fine image even in the peripheral portion of the imaging area by satisfactorily correcting field curvature, distortion, and lateral chromatic aberration.

The third imaging lens according to the third aspect of the invention has at least four lens elements. In the lens, the configurations of power arrangement in the whole system, the position of the aperture diaphragm, and the center thickness of the first lens are appropriately set, thereby satisfying Conditional Expression (3). Hence, it is possible to embody an imaging lens which has a small size and has high optical performance capable of achieving the wide angle of which the total angle of view is larger than 180 degrees and obtaining a fine image even in the peripheral portion of the imaging area by satisfactorily correcting distortion.

The fourth imaging lens according to the fourth aspect of the invention has at least four lens elements. In the lens, the configurations of power arrangement in the whole system, the position of the aperture diaphragm, and the center thickness of the first lens are appropriately set, thereby satisfying Conditional Expression (4). Hence, it is possible to embody an imaging lens which has a small size and has high optical performance capable of achieving the wide angle of which the total angle of view is larger than 180 degrees and obtaining a fine image even in the peripheral portion of the imaging area by satisfactorily correcting distortion.

The imaging apparatus according to the fifth aspect of the invention includes the imaging lens according to the aspects of the invention. Hence, it is possible to achieve a small size, achieve the wide angle of which the total angle of view is larger than 180 degrees, and obtain a fine image even in the peripheral portion of the imaging area.

BRIEF DESCRIPTION OF THE DRAWINGS

The features of the invention will appear more fully upon consideration of the exemplary embodiment of the invention, which are schematically set forth in the drawings, in which:

FIG. 3 is a sectional diagram illustrating a lens configuration of the imaging lens according to Example 1 of the invention;

FIG. 4 is a sectional diagram illustrating a lens configuration of the imaging lens according to Example 2 of the invention;

FIG. 5 is a sectional diagram illustrating a lens configuration of the imaging lens according to Example 3 of the invention;

FIG. 6 is a sectional diagram illustrating a lens configuration of the imaging lens according to Example 4 of the invention;

FIG. 8 is diagrams illustrating various aberrations of the imaging lens according to Example 1 of the invention;

FIG. 9 is diagrams illustrating various aberrations of the imaging lens according to Example 2 of the invention;

FIG. 10 is diagrams illustrating various aberrations of the imaging lens according to Example 3 of the invention;

FIG. 11 is diagrams illustrating various aberrations of the imaging lens according to Example 4 of the invention;

FIG. 12 is diagrams illustrating various aberrations of the imaging lens according to Example 5 of the invention.

DETAILED DESCRIPTION OF THE EXEMPLARY EMBODIMENTS

Hereinafter, exemplary embodiments of the invention will be described in detail with reference to the accompanying drawings.

Embodiment of Imaging Lens

Figure 1:
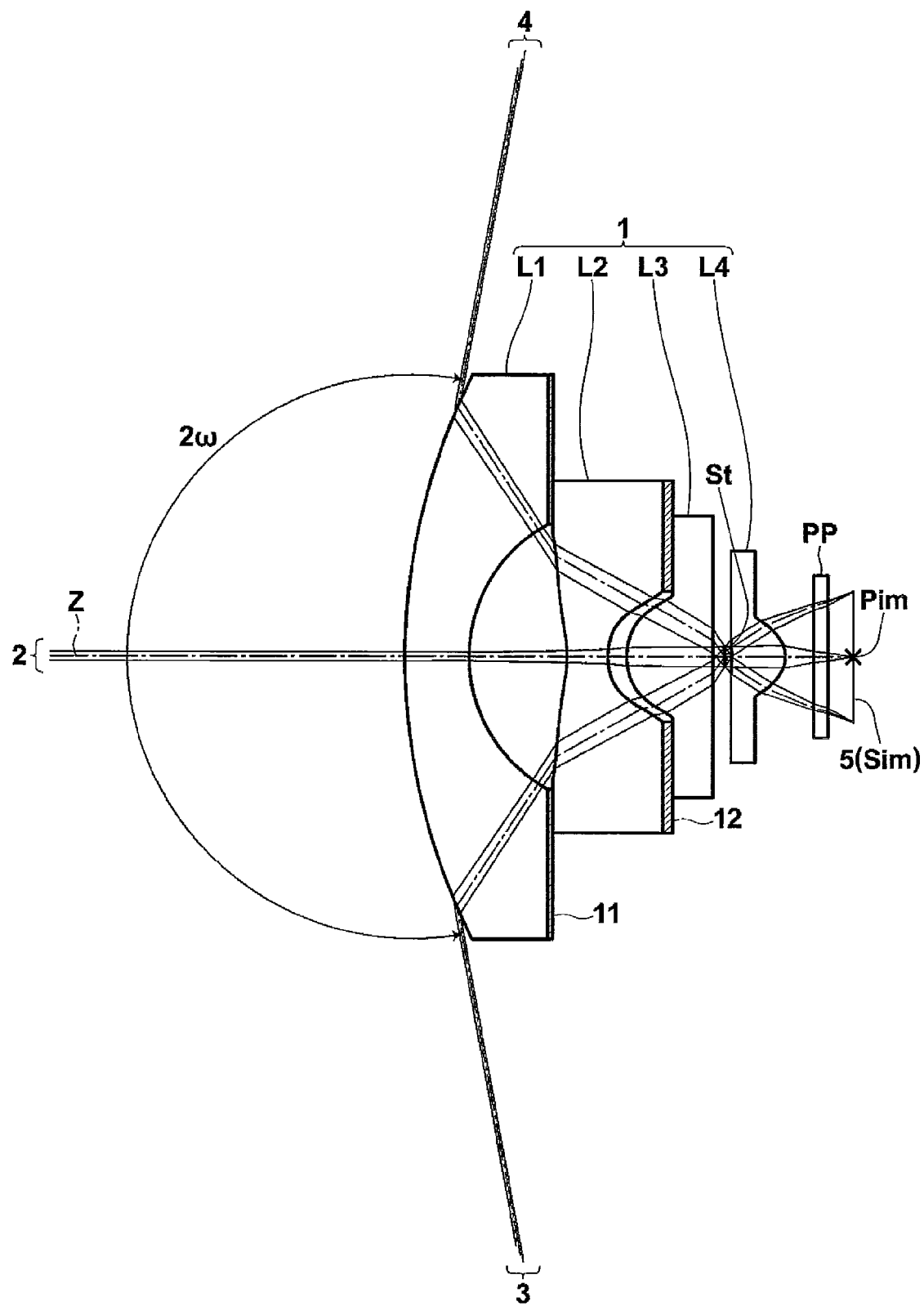
FIG. 1 is a ray tracing diagram of an imaging lens according to an exemplary embodiment of the invention.

First, an imaging lens according to an exemplary embodiment of the invention will be described with reference to FIG. 1. FIG. 1 is a lens sectional diagram of the imaging lens 1 according to Example 1 of the invention. The imaging lens 1 shown in FIG. 1 has configurations according to first to fourth exemplary embodiments of the invention as described below.

In FIG. 1, the left side of the drawing is the object side, and the right side is the image side, and the on-axis rays 2 from the object point at the infinite distance and the off-axis rays 3 and 4 at the total angle of view 2ω are shown together. In FIG. 1, considering that the imaging lens 1 is applied to an imaging apparatus, an imaging device 5, which is disposed on an image plane Sim including an image point Pim of the imaging lens 1, is shown. The imaging device 5 converts an optical image, which is formed by the imaging lens 1, into an electric signal, in which for example a CCD image sensor, a CMOS image sensor, and the like may be used.

Furthermore, when the imaging lens 1 is applied to an imaging apparatus, it is preferable that a cover glass, a low pass filter, an infrared cut filter, or the like be provided in accordance with a configuration of the camera side equipped with the lens. FIG. 1 shows an example in which an optical member PP having a plane parallel plate shape assuming the above is disposed between the lens closest to the image side and the imaging device 5 (the image plane Sim).

First, a configuration according to the first embodiment of the invention is described. The imaging lens according to the first embodiment of the invention includes, in order from the object side, a negative first lens L1, a negative second lens L2, a positive third lens L3, an aperture diaphragm St, and a positive fourth lens L4. Furthermore, the aperture diaphragm St shown in FIG. 1 does not illustrate a shape and a size thereof, but illustrates a position thereof on the optical axis Z.

Since the imaging lens is formed of a small number of lenses, for example, four lenses, it is possible to achieve low costs and a decrease in total length of the system in the direction of the optical axis. Further, since the first lens L1 and the second lens L2, which are two lenses disposed to be close to the object side, are formed as negative lenses, it becomes easy to achieve a wide angle throughout the whole lens. Furthermore, by using two negative lenses, aberration correction required for the negative lenses can be allotted between the two lenses, and thus it is possible to perform correction effectively. Likewise, since the positive lenses close to the image side are also formed of two lenses of the third lens L3 and the fourth lens L4, convergence operation for forming an image on the image plane and aberration correction required for the positive lenses can be allotted between the two lenses. Thus, it is possible to perform correction effectively. Further, by providing the aperture diaphragm St between the third lens L3 and the fourth lens L4, it is possible to miniaturize the whole lens.

Furthermore, the imaging lens according to the first embodiment of the invention is configured so that each of the second lens L2, the third lens L3, and the fourth lens L4 has at least one aspheric surface, an Abbe number of a material of the third lens L3 at the d-line is 35 or less, and the following Conditional Expression (1) is satisfied:

$$-0.2 < (R3+R4)/(R3-R4) < 0.2 \qquad (1)$$

where

R3 is a paraxial radius of curvature of the object side surface of the second lens L2, and R4 is a paraxial radius of curvature of the image side surface of the second lens L2.

Since three lenses of the second lens L2, the third lens L3, and the fourth lens L4 are formed to be aspheric, it is possible to achieve a wide angle of view by satisfactorily correcting aberrations with a small number of lenses.

Since the Abbe number of the material of the third lens L3 at the d-line is 35 or less, it is possible to correct lateral chromatic aberration satisfactorily.

By satisfying Conditional Expression (1), the second lens L2 has a biconcave shape in the paraxial region. Hereinafter, the shape of the second lens L2 in the paraxial region based on Conditional Expression (1) is described.

First, Conditional Expression (1) can be modified into the following Conditional Expression (1A).

$$-0.2 < (1+R4/R3)/(1-R4/R3) < 0.2 \qquad (1A)$$

Assuming that the object side surface of the second lens L2 is planar, that is, R3=∞, Conditional Expression (1A) is not satisfied. Hence, the object side surface of the second lens L2 is not planar.

Likewise, Conditional Expression (1) can be modified into the following Conditional Expression (1B).

$$-0.2 < (R3/R4+1)/(R3/R4-1) < 0.2 \qquad (1B)$$

Assuming that the image side surface of the second lens L2 is planar, that is, R4=∞, Conditional Expression (1B) is not satisfied. Hence, the image side surface of the second lens L2 is not planar.

Next, assuming that the object side surface of the second lens L2 is a convex surface, that is, R3>0, the second lens L2 is a negative lens. Hence, the image side surface of the second lens L2 is not convex, and has a negative meniscus shape concave toward the image side, and thus R4>0 and R3>R4. However, in that case, Conditional Expression (1A) is not satisfied, and thus the assumption that the object side surface of the second lens L2 is convex, that is, R3>0 is not satisfied.

Accordingly, the object side surface of the second lens L2 is concave, that is, R3<0. Then, under the condition of R3<0, assuming that the image side surface of the second lens L2 is convex, that is, R4<0, the second lens L2 is a negative lens, and thus has a negative meniscus shape of R3>R4. However, in that case, Conditional Expression (1A) is not satisfied, and thus the second lens L2 does not have a negative meniscus shape. Accordingly, R3<0 and R4>0, that is, the second lens L2 has a biconcave shape.

Since the radius of curvature of the second lens L2 having such a shape is selected to satisfy Conditional Expression (1), the radius of curvatures of the object side surface and the image side surface of the second lens L2 are balanced with each other. Further, as can be seen from the aspheric surface expression to be described later, an aspheric shape is defined generally on the basis of the paraxial radius of curvature. Hence, by satisfying Conditional Expression (1), it becomes easy to achieve a wide angle of view, and it is possible to correct field curvature and distortion satisfactorily. When the result value of Conditional Expression (1) is equal to or more than the upper limit thereof, the absolute value of the radius of curvature of the object side surface of the second lens L2 increases, and thus it becomes difficult to achieve a wide angle of view while satisfactorily correcting field curvature. Further, the power of the second lens L2 becomes weak, and thus the size of the lens becomes large. When the result value of Conditional Expression (1) is equal to or less than the lower limit thereof, the absolute value of the radius of curvature of the image side surface of the second lens L2 excessively increases, and thus it becomes difficult to achieve a wide angle of view while satisfactorily correcting distortion.

Furthermore, it is preferable to satisfy the following Conditional Expression (1-2). By satisfying the upper limit of Conditional Expression (1-2), it is possible to achieve a wide angle of view while more satisfactorily correcting field curvature. By satisfying the lower limit of Conditional Expression (1-2), it is possible to achieve a wide angle of view while more satisfactorily correcting distortion.

$$-0.08<(R3+R4)/(R3-R4)<0.12 \qquad (1\text{-}2)$$

Furthermore, it is more preferable to satisfy the following Conditional Expression (1-3). By satisfying the upper limit of Conditional Expression (1-3), it is possible to achieve a wide angle of view while further satisfactorily correcting field curvature.

$$-0.08<(R3+R4)/(R3-R4)<0.08 \qquad (1\text{-}3)$$

In addition, it is more preferable to satisfy the following Conditional Expression (1-4). By satisfying the upper limit of Conditional Expression (1-4), it is possible to achieve a wide angle of view while further more satisfactorily correcting field curvature. By satisfying the lower limit of Conditional Expression (1-4), it is possible to achieve a wide angle of view while further more satisfactorily correcting distortion.

$$-0.06<(R3+R4)/(R3-R4)<0.03 \qquad (1\text{-}4)$$

Next, a configuration according to the second embodiment of the invention is described. The imaging lens according to the second embodiment of the invention includes, in order from the object side: a negative first lens L1 which has a meniscus shape concave toward the image side; a second lens L2 of which an object side surface and an image side surface are aspheric; a positive third lens L3 of which an object side surface is aspheric; an aperture diaphragm St; and a positive fourth lens L4 of which an image side surface is aspheric.

Since the imaging lens is formed of a small number of lenses, for example, four lenses, it is possible to achieve low costs and a decrease in total length of the system in the direction of the optical axis. Further, by providing the aperture diaphragm St between the third lens L3 and the fourth lens L4, it is possible to miniaturize the whole lens. In addition, since the first lens L1, which is disposed to be closest to the object side, is formed as a negative meniscus lens concave toward the image side, it is possible to achieve a wide angle of view throughout the whole lens. As a result, it is possible to manufacture a wide angle lens of which a total angle of view is larger than, for example, 180°.

In the imaging lens according to the second embodiment of the invention, the object side surface and the image side surface of the second lens L2, the object side surface of the third lens L3, the image side surface of the fourth lens L4 are formed to be aspheric. That is, in these three lenses, both surfaces of the second lens L2 farthest from the aperture diaphragm St are formed to be aspheric, and a surface, which is farther from the aperture diaphragm St, of each of the third lens L3 and the fourth lens L4 disposed to be close to the aperture diaphragm St is formed to be aspheric. As shown in FIG. 1, the surfaces, at which the off-axis ray and the on-axis ray at the respective image heights are more separated, are formed to be aspheric, and thus it is possible to correct aberrations effectively. As a result, it is advantageous in correcting field curvature and distortion satisfactorily while having a small number of lenses and achieving a wide angle of view.

Further, the imaging lens according to the second embodiment of the invention is configured so that the Abbe number of the material of the third lens L3 at the d-line is 35 or less and the following Conditional Expression (2) is satisfied:

$$1.0<D3/f<5.0 \qquad (2)$$

where
D3 is a center thickness of the second lens L2, and
f is a focal length of the whole system.

Since the Abbe number of the material of the third lens L3 at the d-line is set to be 35 or less, it is possible to correct lateral chromatic aberration satisfactorily.

When the result value of Conditional Expression (2) is equal to or more than the upper limit, the size of the lens becomes large. When the result value of Conditional Expression (2) is equal to or less than the lower limit thereof, the center thickness of the second lens L2 becomes small, the thickness ratio of the peripheral portion and the central portion of the second lens L2 increases, and thus it becomes difficult to form the lens.

Furthermore, it is preferable to satisfy the following Conditional Expression (2-2). When the upper limit of Conditional Expression (2-2) is satisfied, it becomes easier to miniaturize the lens.

$$1.0<D3/f<2.2 \qquad (2\text{-}2)$$

Next, a configuration of a third embodiment of the invention is described. The imaging lens according to the third embodiment of the invention includes, in order from the object side, a negative first lens L1, a negative second lens L2, a positive third lens L3, an aperture diaphragm St, and a positive fourth lens L4.

Since the imaging lens is formed of a small number of lenses, for example, four lenses, it is possible to achieve low costs and a decrease in total length of the system in the direction of the optical axis. Further, since the first lens L1 and the second lens L2, which are two lenses disposed to be close to the object side, are formed as negative lenses, it becomes easy to achieve a wide angle throughout the whole lens. Furthermore, by using two negative lenses, aberration correction required for the negative lenses can be allotted between the two lenses, and thus it is possible to perform correction effectively. Likewise, since the positive lenses close to the image side are also formed of two lenses of the third lens L3 and the fourth lens L4, convergence operation for forming an image on the image plane and aberration correction required for the positive lenses can be allotted between the two lenses. Thus, it is possible to perform correction effectively. Further, by providing the aperture diaphragm St between the third lens L3 and the fourth lens L4, it is possible to miniaturize the whole lens.

Further, the imaging lens according to the third embodiment of the invention is configured so that the center thickness of the first lens L1 is 1.7 mm or more, and the following Conditional Expression (3) is satisfied:

$$2.5<D1/f<5.5 \qquad (3)$$

where
D1 is the center thickness of the first lens L1, and
f is the focal length of the whole system.

For example, when the imaging lens is used in a vehicle, the first lens L1 disposed to be closest to the object side is required to be resistant to various kinds of shock. Hence, it is preferable that the center thickness of the first lens L1 should be 1.7 mm or more, and it is also preferable to satisfy Conditional Expression (3). When the result value of Conditional Expression (3) is equal to or less than the lower limit thereof, the first lens L1 is thin, and is thereby frangible. When the result value of Conditional Expression (3) is equal to or more than the upper limit thereof, the size of the lens becomes large. Alternatively, in order to avoid an increase in size of the first lens L1, it is necessary to deflect significantly the marginal rays by setting the absolute value of the radius of curvature of the object side surface of the first lens L1 to be large. However, when the absolute value of the radius of curvature of the object side surface of the first lens L1 is set to be large and the marginal rays are significantly deflected, distortion increases especially in the peripheral portion. When the distortion increases, the peripheral portion of the image is formed to be small on the image plane Sim. Hence, a problem arises in that the image quality of the peripheral portion becomes lower than that of the central portion even though the image is taken by the imaging device and is enlarged by image processing.

Furthermore, it is preferable to satisfy the following Conditional Expression (3-2). By satisfying the upper limit of Conditional Expression (3-2), it becomes easy to miniaturize the lens. By satisfying the lower limit of Conditional Expression (3-2), it is possible to make the first lens L1 more infrangible.

$$2.5 < D1/f < 3.0 \tag{3-2}$$

Next, a configuration of a fourth embodiment of the invention is described. The imaging lens according to the fourth embodiment of the invention includes, in order from the object side, a negative first lens L1, a negative second lens L2, a positive third lens L3, an aperture diaphragm St, and a positive fourth lens L4.

Since the imaging lens is formed of a small number of lenses, for example, four lenses, it is possible to achieve low costs and a decrease in total length of the system in the direction of the optical axis. Further, since the first lens L1 and the second lens L2, which are two lenses disposed to be close to the object side, are formed as negative lenses, it becomes easy to achieve a wide angle throughout the whole lens. Furthermore, by using two negative lenses, aberration correction required for the negative lenses can be allotted between the two lenses, and thus it is possible to perform correction effectively. Likewise, since the positive lenses close to the image side are also formed of two lenses of the third lens L3 and the fourth lens L4, convergence operation for forming an image on the image plane and aberration correction required for the positive lenses can be allotted between the two lenses. Thus, it is possible to perform correction effectively. Further, by providing the aperture diaphragm St between the third lens L3 and the fourth lens L4, it is possible to miniaturize the whole lens.

Further, the imaging lens according to the fourth embodiment of the invention is configured so that the center thickness of the first lens L1 is 1.7 mm or more, and the following Conditional Expression (4) is satisfied:

$$0.5 < ED1/R1 < 0.95 \tag{4}$$

where

ED1 is an effective diameter of an object side surface of the first lens L1 (diameter), and R1 is a radius of curvature of the object side surface of the first lens L1.

When the result value of Conditional Expression (4) is equal to or more than the upper limit thereof, the shape of the object side surface of the first lens L1 approaches to a hemisphere. Thus, it becomes difficult to process the lens, and this increases costs. Alternatively, a problem also arises in that the size of the first lens L1 becomes large and this is detrimental to the vehicle's outward appearance. When the result value of Conditional Expression (4) is equal to or less than the lower limit thereof, it becomes difficult to correct distortion, and thus the image of the peripheral portion is formed on the image plane Sim. As a result, a problem arises in that the image quality of the peripheral portion becomes lower than that of the central portion even though the image is taken by the imaging device and is enlarged by image processing.

The imaging lens according to the first to fourth embodiments may include at least one configuration of another embodiment or at least one preferred configuration of another embodiment. For example, the imaging lens according to the first embodiment may include the configuration of the second embodiment, and the imaging lens according to the second embodiment may include the above-mentioned preferred configuration of the first embodiment.

Next, referring to the preferred configuration of the imaging lens according to the first to fourth embodiments of the invention, the operations and advantages thereof will be described. Further, the preferred configuration may be any one of the following configurations, or may be a combination of two or more configurations selected at will.

It is preferable to satisfy the following Conditional Expression (5):

$$2.0 < D2/f < 5.0 \tag{5}$$

where f is the focal length of the whole system, and

D2 is an air space on the optical axis between the first lens L1 and the second lens L2.

When the result value of Conditional Expression (5) is equal to or more than the upper limit thereof, the size of the lens becomes large. When the result value of Conditional Expression (5) is equal to or less than the lower limit thereof, the space between the first lens L1 and the second lens L2 becomes small, and thus the aspheric shape of the object side surface of the second lens L2 is restricted. As a result, it becomes difficult to correct field curvature and distortion.

Furthermore, it is preferable to satisfy the following Conditional Expression (5-2). When the upper limit of Conditional Expression (5-2) is satisfied, it becomes easier to miniaturize the lens. When the lower limit of Conditional Expression (5-2) is satisfied, it becomes easier to correct field curvature and distortion.

$$2.3 < D2/f < 4.5 \tag{5-2}$$

It is preferable to satisfy the following Conditional Expression (6):

$$0.01 < |f12/f34| < 0.5 \tag{6}$$

where f12 is a composite focal length of the first lens L1 and the second lens L2, and f34 is a composite focal length of the third lens L3 and the fourth lens L4.

When the result value of Conditional Expression (6) is equal to or more than the upper limit thereof, it becomes difficult to achieve a wide angle of view and field curvature simultaneously increases. As a result, it becomes difficult to obtain a fine image. When the result value of Conditional Expression (6) is equal to or less than the lower limit thereof, it is possible to achieve a wide angle of view easily. However, comatic aberration increases, and thus it becomes difficult to obtain a fine image near the angle of view.

It is preferable to satisfy the following Conditional Expression (7):

$$2.5 < (D4+D5)/f < 5.5 \qquad (7)$$

where f is the focal length of the whole system,

D4 is an air space on the optical axis between the second lens L2 and the third lens L3, and D5 is a center thickness of the third lens L3.

By satisfying Conditional Expression (7), it is possible to correct spherical aberration, distortion, and comatic aberration satisfactorily, and it is possible to obtain a long back focal length as well. Thereby, it is possible to increase the angle of view, and thus sufficient performance is obtained. When the result value of Conditional Expression (7) is equal to or more than the upper limit thereof, it becomes difficult to correct spherical aberration, distortion, and comatic aberration satisfactorily, and thus it also becomes difficult to secure a long back focal length and a large angle of view. Further, when the result value of Conditional Expression (7) is equal to or more than the upper limit thereof, the diameter of the negative first lens L1 closest to the object side increases, and the total length of the lens also increases. As a result, it becomes difficult to miniaturize the lens. When the result value of Conditional Expression (7) is equal to or less than the lower limit thereof, it becomes difficult to correct spherical aberration and comatic aberration satisfactorily. As a result, it also becomes difficult to achieve the lens having a small F number.

Furthermore, it is preferable to satisfy the following Conditional Expression (7-2). By satisfying the upper limit of Conditional Expression (7-2), it is possible to correct spherical aberration, distortion, and comatic aberration more satisfactorily. As a result, it becomes easier to secure a desired back focal length and a large angle of view. By satisfying the lower limit of Conditional Expression (7-2), it becomes easy to correct spherical aberration and comatic aberration.

$$3.0 < (D4+D5)/f < 4.0 \qquad (7-2)$$

It is preferable to satisfy the following Conditional Expression (8). Furthermore, at the time of calculating the distance L, a back focal length is assumed as an air conversion length. Specifically, when a cover glass, a filter, or the like is disposed between the lens closest to the image side and the image plane Sim, air conversion values are used in the thickness of the cover glass or the filter.

$$10.0 < L/f < 20.0 \qquad (8)$$

where f is the focal length of the whole system, and

L is a distance on the optical axis from the object side surface of the first lens L1 to an image plane.

By satisfying Conditional Expression (8), it is possible to achieve miniaturization and a wide angle of view simultaneously. When the result value of Conditional Expression (8) is equal to or more than the upper limit thereof, it is possible to achieve an increase in angle of view, but the size of the lens increases. When the result value of Conditional Expression (8) is equal to or less than the lower limit thereof, it is possible to miniaturize the lens, but it becomes difficult to achieve an increase in angle of view.

Furthermore, it is preferable to satisfy the following Conditional Expression (8-2). By satisfying the upper limit of Conditional Expression (8-2), it becomes easier to miniaturize the lens. In addition, by satisfying the lower limit of Conditional Expression (8-2), it becomes easier to increase an angle of view.

$$13.0 < L/f < 19.0 \qquad (8-2)$$

In order to miniaturize the lens, it is preferable that the distance L on the optical axis from the object side surface of the first lens L1 to the image plane should be 15 mm or less. In addition, in order to miniaturize the lens, it is preferable that the distance L should be 13 mm or less.

It is preferable to satisfy the following Conditional Expression (9). Furthermore, the Bf corresponds to the back focal length, and at the time of calculating the Bf, the air conversion length is used. Specifically, when a cover glass, a filter, or the like is disposed between the lens closest to the image side and the image plane Sim, air conversion values are used therein.

$$1.5 < Bf/f < 4.0 \qquad (9)$$

where f is the focal length of the whole system, and

Bf is a distance on the optical axis from the image side surface of the fourth lens L4 to the image plane.

When the result value of Conditional Expression (9) is equal to or more than the upper limit thereof, the size of the lens increases. When the result value of Conditional Expression (9) is equal to or less than the lower limit, it becomes difficult to insert various filters or cover glasses between the lens and the imaging device.

Furthermore, it is preferable to satisfy the following Conditional Expression (9-2). When the upper limit of Conditional Expression (9-2) is satisfied, it becomes easier to miniaturize further the lens. When the lower limit of Conditional Expression (9-2) is satisfied, it becomes easy to secure the back focal length.

$$2.0 < Bf/f < 3.5 \qquad (9-2)$$

It is preferable to satisfy the following Conditional Expression (10):

$$0.3 < (R8-R9)/(R8+R9) < 1.0 \qquad (10)$$

where

R8 is a paraxial radius of curvature of the object side surface of the fourth lens L4, and R9 is a paraxial radius of curvature of the image side surface of the fourth lens L4.

By satisfying the Conditional Expression (10), the fourth lens L4 has a meniscus shape in the paraxial region. Hereinafter, the shape of the fourth lens L4 in the paraxial region based on Conditional Expression (10) is described.

First, the Conditional Expression (10) can be modified into the following Conditional Expression (10A).

$$0.3 < (1-R9/R8)/(1+R9/R8) < 1.0 \qquad (10A)$$

Assuming that the object side surface of the fourth lens L4 is planar, that is, $R8=\infty$, Conditional Expression (10A) is not satisfied. Hence, the object side surface of the fourth lens L4 is not planar.

Likewise, Conditional Expression (10) can be modified into the following Conditional Expression (10B).

$$0.3 < (R8/R9-1)/(R8/R9+1) < 1.0 \qquad (10B)$$

Assuming that the image side surface of the fourth lens L4 is planar, that is, $R9=\infty$, Conditional Expression (10B) is not satisfied. Hence, the image side surface of the fourth lens L4 is not planar.

Next, assuming that all the object side surface and the image side surface of the fourth lens L4 are convex, that is, $R8>0$ and $R9<0$, $(1-R9/R8)$ in Conditional Expression (10A)

becomes larger than 1, (1+R9/R8) in the same expression becomes smaller than 1, and thus the upper limit of Conditional Expression (10A) is not satisfied. Hence, the assumption that the fourth lens L4 has a biconvex shape, that is, R8>0 and R9<0 is not satisfied.

Assuming that the object side surface of the fourth lens L4 is convex and the image side surface of the fourth lens L4 is concave, that is, R8>0 and R9>0, R8<R9 is satisfied since the fourth lens L4 is a positive lens. However, in that case, the sign of (1−R9/R8) of the Conditional Expression (10A) is negative, and the sign of (1+R9/R8) is positive. Hence, Conditional Expression (10A) is not satisfied, and thus the assumption that the object side surface of the fourth lens L4 is convex, that is, R8>0 is not satisfied.

Accordingly, the object side surface of the fourth lens L4 is concave, that is, R8<0. Furthermore, considering that the fourth lens L4 is a positive lens and the image side surface of the fourth lens L4 is not planar as described above, the fourth lens L4 has a positive meniscus shape.

As described above, by satisfying Conditional Expression (10), it is possible to form the fourth lens L4 in a meniscus shape in the paraxial region, it is possible to manufacture a lens having good telecentricity, and it is also possible to correct field curvature and spherical aberration satisfactorily. Consequently, by satisfying the upper limit of Conditional Expression (10), it is possible to correct field curvature and spherical aberration satisfactorily. Further, by satisfying the lower limit of Conditional Expression (10), it is possible to suppress the situation in which the absolute value of the radius of curvature of the image side surface of the fourth lens L4 becomes excessively large or the absolute value of the radius of curvature of the object side surface of the fourth lens L4 becomes excessively small, and thus the power of the fourth lens L4 becomes excessively small. Thereby, it is possible to suppress deterioration in telecentricity caused by an increase in angle of rays, which are incident on the image plane (the imaging device), near the imaging area. Hence, it is possible to manufacture a lens having so-called telecentricity of good quality.

Furthermore, it is preferable to satisfy the following Conditional Expression (10-2). By satisfying the upper limit of Conditional Expression (10-2), it is possible to correct field curvature and spherical aberration further satisfactorily. By satisfying the lower limit of Conditional Expression (10-2), it is possible to manufacture a lens having a better telecentricity.

$$0.4<(R8-R9)/(R8+R9)<0.9 \quad (10\text{-}2)$$

It is preferable to satisfy the following Conditional Expression (11):

$$-13<R8/f<-3 \quad (11)$$

where f is the focal length of the whole system, and

R8 is the paraxial radius of curvature of the object side surface of the fourth lens L4.

When the result value of Conditional Expression (11) is equal to or more than the upper limit thereof, the power of the fourth lens L4 becomes weak, it becomes difficult to suppress an angle of rays, which are incident on the image plane (the imaging device), near the imaging area. As a result, it becomes difficult to manufacture a lens having so-called telecentricity of good quality. When the result value of Conditional Expression (11) is equal to or less than the lower limit thereof, it becomes difficult to correct spherical aberration.

Furthermore, it is preferable to satisfy the following Conditional Expression (11-2). By satisfying the upper limit of Conditional Expression (11-2), it becomes easier to manufacture a lens having good telecentricity. By satisfying the lower limit of Conditional Expression (11-2), it becomes easier to correct spherical aberration.

$$-11.5<R8/f<-4 \quad (11\text{-}2)$$

It is preferable to satisfy the following Conditional Expression (12):

$$3.2<L/f34<6.0 \quad (12)$$

where

L is a distance on the optical axis from the object side surface of the first lens L1 to an image plane, and f34 is a composite focal length of the third lens L3 and the fourth lens L4.

When the result value of Conditional Expression (12) is equal to or more than the upper limit thereof, the power of the third lens L3 and the power of the fourth lens L4 become strong, and thus it becomes difficult to obtain a long back focal length. When the result value of Conditional Expression (12) is equal to or less than the lower limit thereof, it becomes difficult to correct lateral chromatic aberration, field curvature, and comatic aberration.

It is preferable to satisfy the following Conditional Expression (13):

$$2.0<D5/f<4.0 \quad (13)$$

where f is the focal length of the whole system, and

D5 is the center thickness of the third lens L3.

When the result value of Conditional Expression (13) is equal to or more than the upper limit thereof, the size of the third lens L3 becomes excessively large, and thus the size of the lens becomes large. When the result value of Conditional Expression (13) is equal to or less than the lower limit thereof, the power of the third lens L3 becomes weak, it becomes difficult to correct lateral chromatic aberration, or it becomes difficult to secure the thickness of the edge portion (margin) of the third lens L3.

Furthermore, it is preferable to satisfy the following Conditional Expression (13-2). By satisfying the upper limit of Conditional Expression (13-2), it becomes easy to miniaturize the lens. By satisfying the lower limit of Conditional Expression (13-2), it becomes easy to correct lateral chromatic aberration and secure the thickness of the edge portion of the third lens L3.

$$2.2<D5/f<3.8 \quad (13\text{-}2)$$

It is preferable to satisfy the following Conditional Expression (14):

$$0.3<(R1-R2)/(R1+R2)<0.7 \quad (14)$$

where

R1 is the radius of curvature of the object side surface of the first lens L1, and R2 is the radius of curvature of the image side surface of the first lens L1.

When the result of Conditional Expression (14) is equal to or more than the upper limit thereof, the absolute value of the radius of curvature of the object side surface of the first lens L1 becomes excessively large, and thus it becomes difficult to correct distortion, or the absolute value of the radius of curvature of the image side of the first lens L1 becomes excessively large, and thus it becomes difficult to achieve a wide angle of view. When the result value of Conditional Expression (14) is equal to or less than the lower limit thereof, the absolute value of the radius of curvature of the object side surface of the first lens L1 becomes excessively small, and thus it becomes difficult to achieve a wide angle of view and the shape of the surface approaches to a hemisphere, or the absolute value of the radius of curvature of the image side of the first lens L1 becomes excessively small, and thus it becomes difficult to process the lens.

It is preferable that the first lens L1 should have a negative meniscus shape in the paraxial region. With such a configuration, the system is advantageous in a wide angle of view. For example, it is possible to manufacture a lens with a wide angle of which the total angle of view is larger than 180 degrees.

It is preferable that the second lens L2 should have a biconcave shape in the paraxial region. With such a configuration, it becomes easy to achieve a wide angle of view, and it is possible to correct distortion and field curvature satisfactorily.

It is preferable that the object side surface of the second lens L2 should have a shape in which it has a negative power at the center and a negative power at the effective diameter edge which is smaller than that at the center. By forming the object side surface of the second lens L2 in such a shape, it is possible to achieve a wide angle of view and satisfactorily correct field curvature and distortion.

Figure 2:
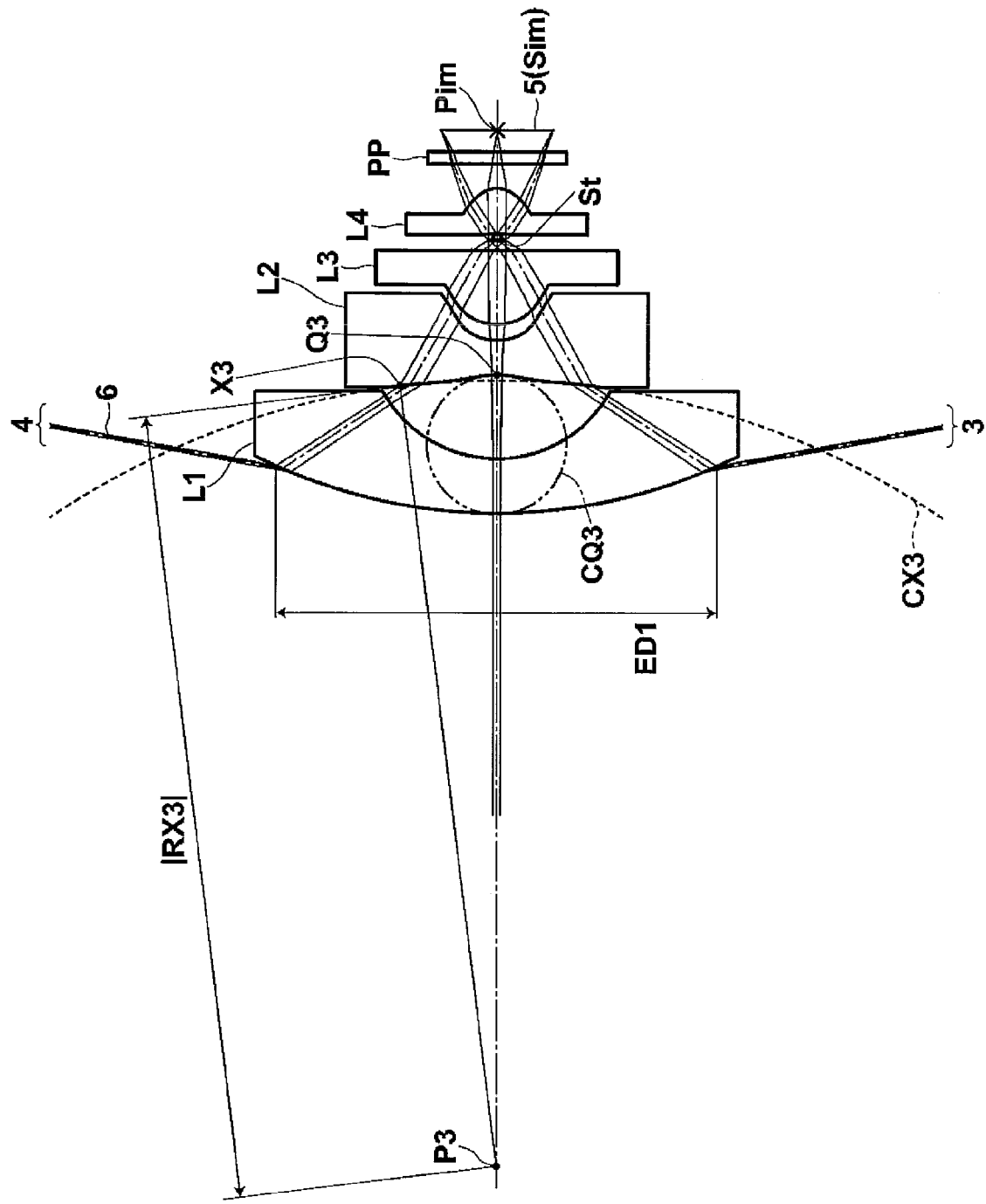
FIG. 2 is a diagram illustrating a surface shape of a second lens.
Figure 7:
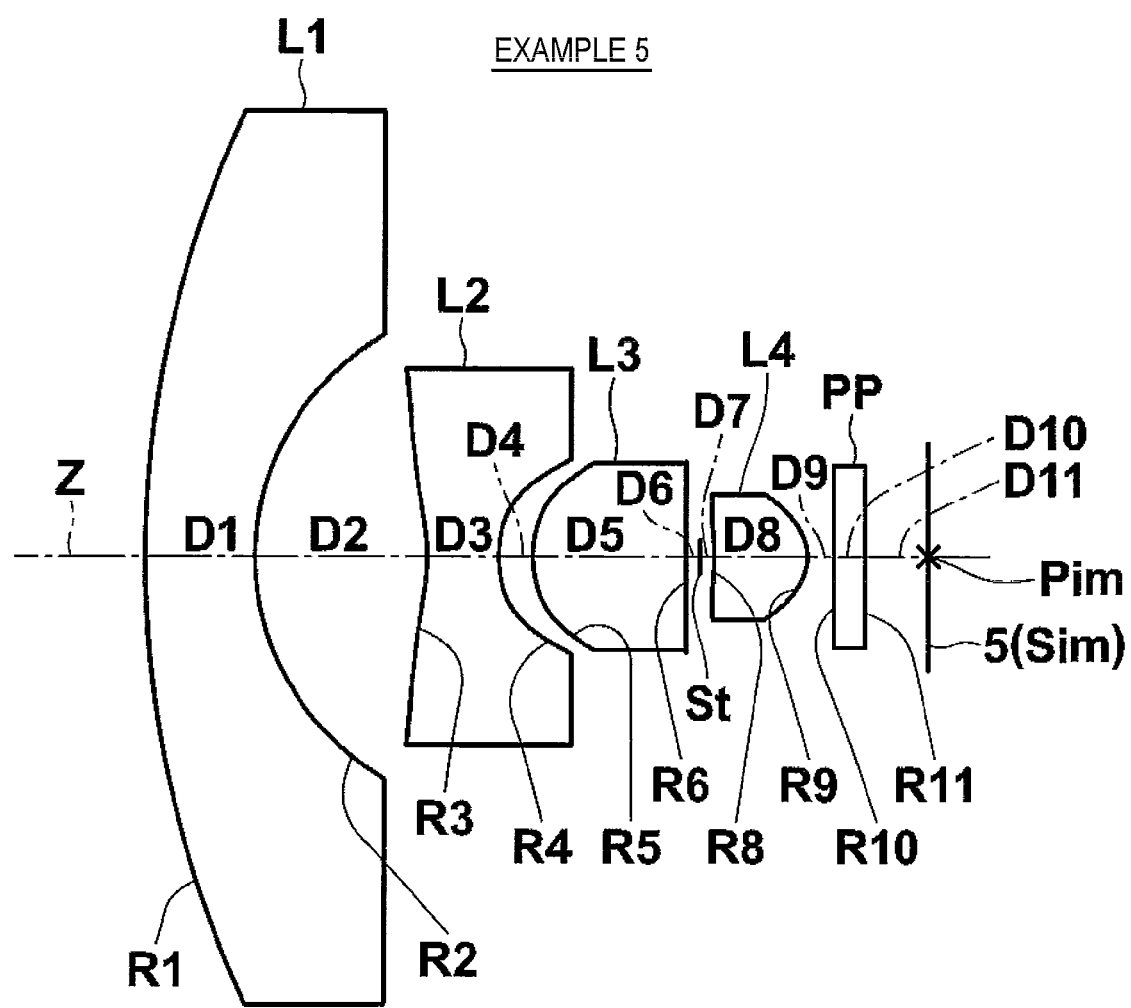
FIG. 7 is a sectional diagram illustrating a lens configuration of the imaging lens according to Example 5 of the invention.

Here, the shape of the object side surface of the second lens L2 is described with reference to FIG. 2. FIG. 2 is a ray tracing diagram of the imaging lens 1 shown in FIG. 1. In FIG. 2, the point Q3 is the center of the object side surface of the second lens L2, and is an intersection point between the object side surface of the second lens L2 and the optical axis Z. The point X3 shown in FIG. 2 is a point at the effective diameter edge of the object side surface of the second lens L2, and an intersection point between the object side surface of the second lens L2 and the outermost ray 6 included in the off-axis rays 4.

In this case, the intersection point between the normal line of the lens surface at the point X3 and the optical axis Z is represented by the point P3 as shown in FIG. 2, the segment X3-P3 connecting the point X3 and the point P3 is defined as a radius of curvature RX3 at the point X3, and a length |X3-P3| of the segment X3-P3 connecting the point X3 and the point P3 is defined as an absolute value |RX3| of the radius of curvature RX3. That is, |X3-P3| is equal to |RX3|. Further, the radius of curvature at the point Q3, that is, the radius of curvature at the center of the object side surface of the second lens L2 is represented by R3. In addition, an absolute value thereof is defined as |R3| (not shown in FIG. 2).

In the above description, the object side surface of the second lens L2 "has a negative power at the center". This means that the surface has a concave shape in a paraxial region including the point Q3. Further, the object side surface of the second lens L2 has "the shape in which a negative power at the effective diameter edge thereof is smaller than that at the center thereof". This means that the surface has the shape in which the point P3 is closer to the object side than the point Q3 and the absolute value of the radius of curvature |RX3| at the point X3 is larger than the absolute value of the radius of curvature |R3| at the point Q3.

In FIG. 2, in order to facilitate understanding, the circle CQ3, which passes through the point Q3 at the radius |R3| and is centered at the point on the optical axis, is represented by the chain double-dashed line, and the circle CX3, which passes through the point X3 at the radius |RX3| and is centered at the point on the optical axis, is represented by the dashed line. In addition, since the circle CX3 is larger than the circle CQ3, |R3|<|RX3| is clarified.

The object side surface of the second lens L2 may have a shape in which it has a negative power at the center and has a positive power at the effective diameter edge. By forming the object side surface of the second lens L2 in such a shape, it is possible to achieve a wide angle of view and satisfactorily correct field curvature and distortion.

In the above description, the object side surface of the second lens L2 "has a negative power at the center". This means that the surface has a concave shape in a paraxial region including the point Q3. Further, in the above description, the object side surface of the second lens L2 has "the shape in which it has a positive power at the effective diameter edge". This means that the surface has the shape in which the point P3 is closer to the image side than the point Q3.

It is preferable that the absolute value of the radius of curvature |RX3| at the point X3 should be larger than 5.0 times the absolute value of the radius of curvature |R3| at the point Q3. That is, it is preferable to satisfy 5.0<|RX3|/|R3|. In this case, it becomes easy to correct field curvature and distortion.

It is preferable that the image side surface of the second lens L2 should have a shape in which it has a negative power at the center and a negative power at the effective diameter edge which is larger than that at the center. By forming the image side surface of the second lens L2 in such a shape, it is possible to correct field curvature satisfactorily.

The shape of the image side surface of the second lens L2, similarly to the shape of the object side surface of the second lens L2 described with reference to FIG. 2, can be described as follow. In the sectional diagram of the lens, the effective diameter edge of the image side surface of the second lens L2 is assumed as the point X4, and the intersection point between the normal line at the point X4 and the optical axis Z is assumed as the point P4. In this case, the segment X4-P4 connecting the point X4 and the point P4 is defined as a radius of curvature RX4 at the point X4, and a length |X4-P4| of the segment connecting the point X4 and the point P4 is defined as an absolute value |RX4| of a radius of curvature at the point X4. Accordingly, |X4-P4| is equal to |RX4|. Further, the intersection point between the image side surface of the second lens L2 and the optical axis Z, that is, the center of the image side surface of the second lens L2 is assumed as the point Q4. In addition, an absolute value of a radius of curvature at the point Q4 is defined as |R4|.

In the above description, the image side surface of the second lens L2 has "the shape in which it has a negative power at the center and a negative power at the effective diameter edge which is larger than that at the center". This means that the surface has a concave shape in the paraxial region including the point Q4. In addition, this means that the surface has the shape in which the point P4 is closer to the image side than the point Q4 and the absolute value of the radius of curvature |RX4| at the point X4 is smaller than the absolute value of the radius of curvature |R4| at the point Q4.

It is preferable that the absolute value of the radius of curvature |RX4| at the point X4 should be smaller than 0.9 times the absolute value of the radius of curvature |R4| at the point Q4. That is, it is preferable to satisfy 0.9>|RX4|/|R4|. In this case, it becomes easy to correct field curvature.

It is preferable that the third lens L3 should have a biconvex shape in the paraxial region. With such a configuration, it is possible to correct field curvature and lateral chromatic aberration satisfactorily.

It is preferable that the object side surface of the third lens L3 should be aspheric. It is preferable that the object side surface of the third lens L3 should have a shape in which it has a positive power at the center and the positive power at the effective diameter edge which is larger than that at the center. By forming the object side surface of the third lens L3 in such a shape, it is possible to correct field curvature and comatic aberration satisfactorily.

The shape of the object side surface of the third lens L3, similarly to the shape of the object side surface of the second lens L2 described with reference to FIG. 2, can be described as follow. In the sectional diagram of the lens, the effective diameter edge of the object side surface of the third lens L3 is assumed as the point X5, and the intersection point between the normal line at the point and the optical axis Z is assumed as the point P5. In this case, the segment X5-P5 connecting the point X5 and the point P5 is defined as a radius of curvature RX5 at the point X5, and a length |X5-P5| of the segment connecting the point X5 and the point P5 is defined as an absolute value |RX5| of a radius of curvature at the point X5. Accordingly, |X5-P5| is equal to |RX5|. Further, the intersection point between the object side surface of the third lens L3 and the optical axis Z, that is, the center of the object side surface of the third lens L3 is assumed as the point Q5. In addition, an absolute value of a radius of curvature at the point Q5 is defined as |R5|.

In the above description, the object side surface of the third lens L3 has "the shape in which it has a positive power at the center and a positive power at the effective diameter edge which is larger than that at the center". This means that the surface has a convex shape in the paraxial region including the point Q5. In addition, this means that the surface has the shape in which the point P5 is closer to the image side than the point Q5 and the absolute value of the radius of curvature |RX5| at the point X5 is smaller than the absolute value of the radius of curvature |R5| at the point Q5.

It is preferable that the absolute value of the radius of curvature |RX5| at the point X5 should be smaller than 1.0 time the absolute value of the radius of curvature |R5| at the point Q5. That is, it is preferable to satisfy 1.0>|RX5|/|R5|. In this case, it becomes easy to correct field curvature and comatic aberration.

It is preferable that the image side surface of the third lens L3 should be aspheric. It is preferable that the image side surface of the third lens L3 should have a shape in which it has a positive power at the center and has a negative power at the effective diameter edge. By forming the image side surface of the third lens L3 in such a shape, it is possible to correct field curvature satisfactorily.

The shape of the image side surface of the third lens L3, similarly to the shape of the object side surface of the second lens L2 described with reference to FIG. 2, can be described as follow. In the sectional diagram of the lens, the effective diameter edge of the image side surface of the third lens L3 is assumed as the point X6, and the intersection point between the normal line at the point X6 and the optical axis Z is assumed as the point P6. In this case, the segment X6-P6 connecting the point X6 and the point P6 is defined as a radius of curvature RX6 at the point X6, and a length |X6-P6| of the segment connecting the point X6 and the point P6 is defined as an absolute value |RX6| of a radius of curvature at the point X6. Accordingly, |X6-P6| is equal to |RX6|. Further, the intersection point between the image side surface of the third lens L3 and the optical axis Z, that is, the center of the image side surface of the third lens L3 is assumed as the point Q6. In addition, an absolute value of a radius of curvature at the point Q6 is defined as |R6|.

In the above description, the image side surface of the third lens L3 has "the shape in which it has a positive power at the center and has a negative power at the effective diameter edge". This means that the surface has a convex shape in the paraxial region including the point Q6. In addition, this means that the surface has the shape in which the point P6 is closer to the image side than the point Q6.

It is preferable that the absolute value of the radius of curvature |RX6| at the point X6 should be larger than 2.0 times the absolute value of the radius of curvature |R6| at the point Q6. That is, it is preferable to satisfy 2.0<|RX6|/|R6|. In this case, it becomes easy to correct field curvature and comatic aberration.

It is preferable that the fourth lens L4 should be formed as a positive meniscus lens in the paraxial region. With such a configuration, it is possible to correct spherical aberration and field curvature satisfactorily.

It is preferable that the object side surface of the fourth lens L4 should be aspheric. It is preferable that the object side surface of the fourth lens L4 should have a shape in which it has a negative power at the center and a negative power at the effective diameter edge which is larger than that at the center. By forming the object side surface of the fourth lens L4 in such a shape, it is possible to correct spherical aberration, comatic aberration, and field curvature satisfactorily.

The shape of the object side surface of the fourth lens L4, similarly to the shape of the object side surface of the second lens L2 described with reference to FIG. 2, can be described as follow. In the sectional diagram of the lens, the effective diameter edge of the object side surface of the fourth lens L4 is assumed as the point X8, and the intersection point between the normal line at the point X8 and the optical axis Z is assumed as the point P8. In this case, the segment X8-P8 connecting the point X8 and the point P8 is defined as a radius of curvature RX8 at the point X8, and a length |X8-P8| of the segment connecting the point X8 and the point P8 is defined as an absolute value of a radius of curvature |RX8| at the point X8. Accordingly, |X8-P8| is equal to |RX8|. Further, the intersection point between the object side surface of the fourth lens L4 and the optical axis Z, that is, the center of the object side surface of the fourth lens L4 is assumed as the point Q8. In addition, an absolute value of a radius of curvature at the point Q8 is defined as |R8|.

In the above description, the object side surface of the fourth lens L4 has "the shape in which it has a negative power at the center and a negative power at the effective diameter edge which is larger than that at the center". This means that the surface has a concave shape in the paraxial region including the point Q8. In addition, this means that the surface has the shape in which the point P8 is closer to the object side than the point Q8 and the absolute value of the radius of curvature |RX8| at the point X8 is smaller than the absolute value of the radius of curvature |R8| at the point Q8.

It is preferable that the absolute value of the radius of curvature |RX8| at the point X8 should be smaller than 0.9 times the absolute value of the radius of curvature |R8| at the point Q8. That is, it is preferable to satisfy 0.9>|RX8|/|R8|. In this case, it becomes easy to correct field curvature.

It is preferable that the image side surface of the fourth lens L4 should be aspheric. It is preferable that the image side surface of the fourth lens L4 should have a shape in which it has a positive power at the center and a positive power at the effective diameter edge which is smaller than that at the center. By forming the fourth lens L4 in such a shape, it is possible to correct spherical aberration, field curvature, and comatic aberration satisfactorily.

The shape of the image side surface of the fourth lens L4, similarly to the shape of the object side surface of the second lens L2 described with reference to FIG. 2, can be described as follow. In the sectional diagram of the lens, the effective diameter edge of the image side surface of the fourth lens L4 is assumed as the point X9, and the intersection point between the normal line at the point X9 and the optical axis Z is assumed as the point P9. In this case, the segment X9-P9 connecting the point X9 and the point P9 is defined as a radius of curvature RX9 at the point X9, and a length |X9-P9| of the segment connecting the point X9 and the point P9 is defined as an absolute value of a radius of curvature |RX9| at the point X9. Accordingly, |X9-P9| is equal to |RX9|. Further, the intersection point between the image side surface of the fourth lens L4 and the optical axis Z, that is, the center of the image side surface of the fourth lens L4 is assumed as the point Q9. In addition, an absolute value of a radius of curvature at the point Q9 is defined as |R9|.

In the above description, the image side surface of the fourth lens L4 has "the shape in which it has a positive power at the center and a positive power at the effective diameter edge which is smaller than that at the center". This means that the surface has a convex shape in the paraxial region including the point Q9. In addition, this means that the surface has the shape in which the point P9 is closer to the object side than the point Q9 and the absolute value of the radius of curvature |RX9| at the point X9 is larger than the absolute value of the radius of curvature |R9| at the point Q9.

It is preferable that the absolute value of the radius of curvature |RX9| at the point X9 should be larger than 1.1 times the absolute value of the radius of curvature |R9| at the point Q9. That is, it is preferable to satisfy 1.1<|RX9|/|R9|. In this case, it becomes easy to correct spherical aberration, field curvature, and comatic aberration.

By forming the respective surfaces from the object side surface of the second lens L2 to the image side surface of the fourth lens L4 in the above-mentioned aspheric shapes, it is possible to correct spherical aberration, field curvature, comatic aberration, and distortion satisfactorily.

Furthermore, the image side surface of the third lens L3 may be configured to have a shape in which it has a negative power at the center and a negative power at the effective diameter edge which is larger than that at the center. In this case, it becomes easy to correct spherical aberration.

By using the signs defined above, the following configuration is described. The image side surface of the third lens L3 has "the shape in which it has a negative power at the center and a negative power at the effective diameter edge which is larger than that at the center". This means that the surface has a concave shape in the paraxial region including the point Q6. In addition, this means that the surface has the shape in which the point P6 is closer to the image side than the point Q6 and the absolute value of the radius of curvature |RX6| at the point X6 is smaller than the absolute value of the radius of curvature |R6| at the point Q6.

It is preferable that distortion should be a positive value in the range from the center to the maximum angle of view when the distortion is represented as a deviation from the ideal image height expressed by 2f×tan($\phi$/2) where the focal length of the whole system is f, and the angle of view is $\phi$ (assumed as a variable, $0 \leq \phi \leq \omega$, $\omega$ is a half angle of view). By setting distortion to be a positive value in the range from the center to the maximum angle of view relative to the ideal image height 2f××tan($\phi$/2), it is possible to minimize image deformation in the peripheral portion of the image, which is caused by the distortion, and thus it is possible to suppress deterioration in image.

It is preferable that the Abbe number of the material of the first lens L1 at the d-line should be 40 or more. Thereby, it is possible to suppress occurrence of chromatic aberration, and thus it is possible to obtain a favorable resolving power. It is preferable that the Abbe number of the material of the second lens L2 at the d-line should be 40 or more. Thereby, it is possible to suppress occurrence of chromatic aberration, and thus it is possible to obtain a favorable resolving power. It is preferable that the Abbe number of the material of the fourth lens L4 at the d-line should be 40 or more. Thereby, it is possible to suppress occurrence of chromatic aberration, and thus it is possible to obtain a favorable resolving power.

It is preferable that the Abbe number of the material of the third lens L3 at the d-line should be 30 or less. Thereby, it is possible to correct lateral chromatic aberration satisfactorily. Furthermore, it is more preferable that the Abbe number of the material of the third lens L3 at the d-line should be 28 or less. Thereby, it is possible to correct lateral chromatic aberration further satisfactorily.

It is preferable that the first lens L1 should be made of glass. When the imaging lens is used in a severe environment such as an on-board camera, it is required that the first lens L1 disposed closest to the object side should have high resistivity with respect to temperature variance caused by direct rays and surface deterioration caused by rainstorm. In addition, it is required that the lens should use a material having high resistivity with respect to chemicals such as oils and cleansers (洗剤: クレンザーの意です), that is, a material having high water resistance, high antiweatherability, high acid resistance, and high chemical resistance. In addition, it is also required that the lens should use a hard and infrangible material. By using glass as the material, it is possible to satisfy these requirements. Further, the first lens L1 may be made of transparent ceramic.

For example, the lenses for on-board cameras are required to be resistant to various kinds of shock. Hence, it is preferable that the first lens L1 should be thick. It is preferable that the center thickness of the first lens L1 should be 1.7 mm or more. Further, in order to make the first lens L1 infrangible, it is more preferable that the center thickness of the first lens L1 should be 1.75 mm or more. Further, in order to make the first lens L1 more infrangible, it is further more preferable that the center thickness of the first lens L1 should be 1.80 mm or more.

Furthermore, the object side surface of the first lens L1 may employ a protective member for enhancing stiffness, scratch resistance, and chemical resistance. In this case, the first lens L1 may be made of plastic. Such a protective member may include a hard coat and a hydrophobic coat.

It is preferable that any one of the second lens L2, the third lens L3, and the fourth lens L4 or a plurality of optional combinations of those should be made of plastic. By using the material thereof as plastic, it is possible to form a low-cost and lightweight lens. In addition, when an aspheric surface is provided, it is possible to manufacture an aspheric shape thereof precisely. Hence, it is possible to manufacture a lens having a desirable performance.

In the case where at least any one of the second lens L2, the third lens L3, and the fourth lens L4 is made of plastic, the material thereof may include a so-called nanocomposite material formed by mixing particulates, which have sizes smaller than a wavelength of light, into the plastic.

Any one of the second lens L2, the third lens L3, and the fourth lens L4 or the plurality of optional combinations of those may be made of glass. By using glass as the material thereof, it is possible to suppress deterioration in performance caused by temperature change.

At least any one of the first lens L1, the second lens L2, the third lens L3, and the fourth lens L4 it is preferable that the glass transition temperature (Tg) should be 145° C. or more. In addition, it is more preferable that the glass transition temperature of the material be 150° C. or more. By using the material having the glass transition temperature of 150° C. or more, it is possible to form a lens with higher heat resistance.

Furthermore, depending on the use of the imaging lens 1, a filter for cutting blue light from ultraviolet light or a filter such as an IR (Infra Red) cut filter for cutting infrared light may be interleaved between the lens and the imaging device 5. A coat having the same characteristics as the filters may be applied to the lens surface. Alternatively, a material for absorbing ultraviolet light, blue light, infrared light, and the like may be used as any one of the lens materials.

FIG. 1 shows an example in which the optical member PP assumed as various filters or the like is disposed between the lens and the imaging device 5. Instead, various filters may be disposed between the lenses. Alternatively, a coat having the same effect as the various filters may be applied onto the lens surface of the several lenses included in the imaging lens.

In addition, there is a concern that rays passing through outside the effective diameter reach the image plane as stray light and become a ghost image, and thus it is preferable to screen the stray light by providing a light screening means as necessary. Examples of the screening means may include an opaque coating material and an opaque plate member provided on a portion outside the effective diameter of a lens. Alternatively, the stray light may be screened by providing an opaque plate member on the optical path of the stray light, as the light screening means. Alternatively, a hood and the like for screening the stray light may be disposed closer to the object side than the lens closest to the object side. In FIG. 1, there is shown an example in which screening means 11 and 12 are provided outside the effective diameter ranges of the respective image side surfaces of the first lens L1 and the second lens L2. Furthermore, the location, on which the light screening means is provided, is not limited to the example shown in FIG. 1, and the light screening means may be disposed on another lens or between lenses.

Furthermore, a member for screening marginal rays in the range, in which there is no trouble in the relative illumination in practice, may be disposed between the lenses. The marginal rays are defined rays, which are transmitted through the peripheral portion of the entrance pupil of the optical lens, among rays from the object point except for the optical axis Z. As described above, by arranging the member for screening the marginal rays, it is possible to improve image quality in the peripheral portion of the imaging area. Further, by allowing the member to screen the light causing the ghost, it is possible to reduce the ghost.

Numerical Examples of Imaging Lens

Next, numerical examples of the imaging lens according to the embodiment of the invention will be described. FIGS. 3 to 7 show the lens sectional diagrams of the imaging lens according to Examples 1 to 5. In FIGS. 3 to 7, the left side of the drawing is the object side, and the right side thereof is the image side. Similarly to FIG. 1, the drawings show the aperture diaphragm St, the optical member PP, and the imaging device 5 disposed on the image plane Sim. The aperture diaphragm St shown in the drawings does not illustrate a shape and a size thereof, but illustrates a position thereof on the optical axis Z. In each of the examples, the reference numerals Ri and Di (i=1, 2, 3, . . . ) of each lens sectional diagram correspond to the reference numerals Ri and Di of each lens data to be described below.

Table 1 shows lens data and various data of the imaging lens according to Example 1, Table 2 shows aspheric surface data, and Table 3 shows data on radius of curvature. Likewise, Tables 4 to 15 show lens data, various data, and aspheric surface data of the imaging lenses according to Examples 2 to 5. Hereinafter, the meanings of the reference signs in the tables are described through Example 1, and are basically the same as those of Examples 2 to 5.

In the lens data of Table 1, a surface number Si represents the sequential number of i-th (i=1, 2, 3, surface that sequentially increases as it gets closer to the image side when a surface of a component closest to the object side is defined as a first surface. In Table 1, Ri represents a radius of curvature of i-th surface, and Di represents an on-axis surface spacing on the optical axis Z between the i-th surface and the (i+1)th surface. Furthermore, it is assumed that the algebraic sign of the radius of curvature of the surface convex toward the object side is positive, and the algebraic sign of the radius of curvature of the surface convex toward the image side is negative.

Further, in the lens data, Ndj represents a refractive index at the d-line (a wavelength of 587.6 nm) in a j-th (j=1, 2, 3, . . . ) optical element of which the sequential number sequentially increases as it gets closer to the image side when a surface of the optical element closest to the object side is defined as a first surface. In addition, vdj represents an Abbe number of the j-th optical element at the d-line. Furthermore, the lens data also show the aperture diaphragm St and the optical member PP. The item of the surface number of the surface corresponding to the aperture diaphragm St is noted as the term "aperture diaphragm".

In the various data of Table 1, Fno. represents an F number, 2ω represents a total angle of view, Bf represents a distance (corresponds to a back focal length, an air conversion length) on the optical axis Z from the image side surface of the lens closest to the image side to the image plane, L represents a distance (the back focal length part is air-converted) on the optical axis Z from the object side surface of the first lens L1 to the image plane Sim, and ED1 represents an effective diameter of the object side surface of the first lens L1. In addition, f represents a focal length of the whole system, f1 represents a focal length of the first lens L1, f2 represents a focal length of the second lens L2, f3 represents a focal length of the third lens L3, f4 represents a focal length of the fourth lens L4, f12 represents a composite focal length of the first lens L1 and the second lens L2, f34 represents a composite focal length of the third and fourth lenses L3 and L4, and f23 represents a composite focal length of the second and third lenses L2 and L3.

In the lens data of Table 1, the reference numeral * is added to the surface numbers of the aspheric surfaces, and numerical values of the radius of curvature (the radius of curvature at the center) near the optical axis are shown as the radius of curvatures of the aspheric surfaces. The aspheric surface data of Table 2 shows the surface numbers of the aspheric surfaces and the aspheric coefficients of the respective aspheric surfaces. In the Table 2, "E-n" (n is an integer) in the numerical values of the aspheric surface data means "×10$^{-n}$", and "E+n" in the numerical values of the aspheric surface data means "×10$^{n}$". Furthermore, the aspheric coefficients are values of the respective coefficients KA and $RB_m$ (m=3, 4, 5, . . . 20) in the following Aspheric Expression (A):

$$Zd = C \cdot h^2 / \{1 + (1 - KA \cdot C^2 \cdot h^2)^{1/2}\} + \Sigma RB_m \cdot h^m \quad (A)$$

where

Zd is a depth of an aspheric surface (a length of a perpendicular line dropped from a point, which exists on an aspheric surface at a height h from the optical axis, to a plane, which is perpendicular to the optical axis, tangent to the vertex of the aspheric surface), h is a height (a distance from the optical axis to the lens surface), C is an inverse value of a paraxial radius of curvature, and KA and $RB_m$ are aspheric coefficients (m=3, 4, 5, . . . 20).

The data of the radius of curvature of Table 3 shows surface numbers, absolute values of radius of curvatures at an effective diameter edge, and ratios of the absolute values of radius of curvatures at the effective diameter edge to absolute values of radius of curvatures at the center, with reference to the above mentioned reference signs. The |RX3| represents an absolute value of the radius of curvature at the effective diameter edge of the object side surface of the second lens L2. In addition, the |RX3|/|R3| represents the ratio of the absolute value of radius of curvature at the effective diameter edge of the object side surface of the second lens L2 to the absolute value of the radius of curvature at the center thereof. The |RX4| represents an absolute value of the radius of curvature at the effective diameter edge of the image side surface of the second lens L2. In addition, the |RX4|/|R4| represents the ratio of the absolute value of radius of curvature at the effective diameter edge of the image side surface of the second lens L2 to the absolute value of the radius of curvature at the center thereof. The |RX5| represents an absolute value of the radius of curvature at the effective diameter edge of the object side surface of the third lens L3. In addition, the |RX5|/|R5| represents the ratio of the absolute value of radius of curvature at the effective diameter edge of the object side surface of the third lens L3 to the absolute value of the radius of curvature at the center thereof. The |RX6| represents an absolute value of the radius of curvature at the effective diameter edge of the image side surface of the third lens L3. In addition, the |RX6|/|R6| represents the ratio of the absolute value of radius of curvature at the effective diameter edge of the image side surface of the third lens L3 to the absolute value of the radius of curvature at the center thereof. The |RX8| represents an absolute value of the radius of curvature at the effective diameter edge of the object side surface of the fourth lens L4. In addition, the |RX8|/|R8| represents the ratio of the absolute value of radius of curvature at the effective diameter edge of the object side surface of the fourth lens L4 to the absolute value of the radius of curvature at the center thereof. The |RX9| represents an absolute value of the radius of curvature at the effective diameter edge of the image side surface of the fourth lens L4. In addition, the |RX9|/|R9| represents the ratio of the absolute value of radius of curvature at the effective diameter edge of the image side surface of the fourth lens L4 to the absolute value of the radius of curvature at the center thereof.

Furthermore, Tables 1 to 3 show numerical values which are rounded off to a predetermined decimal place. Regarding units of the numerical values, "degree" is used for 2ω of Table 1, and "mm" is used for the length. However, those are just examples, and other appropriate units may be used since the optical system has the same optical performance even when scaled up or scaled down.

TABLE 1

| | Example 1 Lens Data | | | | Example 1 Various Data | |
|---|---|---|---|---|---|---|
| Si | Ri | Di | Ndj | νdj | Fno. | 2.8 |
| 1 | 17.8693 | 1.8000 | 1.77250 | 49.6 | 2ω | 200.6 |
| 2 | 4.3015 | 2.7700 | | | Bf | 1.78 |
| 3* | −2.3041 | 1.1500 | 1.53389 | 56.0 | L | 12.49 |
| 4* | 2.5054 | 0.5200 | | | ED1 | 14.58 |
| 5* | 1.9355 | 2.4300 | 1.61396 | 25.5 | f | 0.70 |
| 6* | −26.8680 | 0.3440 | | | f1 | −7.78 |
| 7 (Aperture Diaphragm) | ∞ | 0.1960 | | | f2 | −2.08 |
| 8* | −7.2959 | 1.5000 | 1.53389 | 56.0 | f3 | 3.04 |
| 9* | −0.8090 | 0.8000 | | | f4 | 1.58 |
| 10 | ∞ | 0.4000 | 1.51680 | 64.2 | f12 | −1.28 |
| 11 | ∞ | 0.7175 | | | f34 | 2.98 |
| Image Plane | ∞ | | | | f23 | 281.11 |

TABLE 2

Example 1 Aspheric Surface Data

| Si | KA | RB3 | RB4 | RB5 | RB6 |
|---|---|---|---|---|---|
| 3 | 0.0000000E+00 | 1.1653827E−01 | −1.8636336E−02 | −1.1947154E−03 | 9.1398589E−05 |
| 4 | 0.0000000E+00 | 6.3956034E−02 | 8.6718689E−02 | −8.0754884E−02 | 3.0017612E−02 |
| 5 | 0.0000000E+00 | 4.6807814E−02 | −7.6100827E−02 | 9.9181960E−02 | 3.3619602E−03 |
| 6 | 0.0000000E+00 | −8.7917006E−02 | 4.1282208E−01 | −3.8877619E−01 | −1.6580207E−01 |
| 8 | 0.0000000E+00 | 3.5209446E−02 | −3.0931879E−01 | −1.0145646E+00 | 6.3324260E+00 |
| 9 | 0.0000000E+00 | 1.2322568E−02 | −2.8539274E−02 | −1.2781895E−03 | −3.4674531E−02 |

| Si | RB7 | RB8 | RB9 | RB10 | RB11 |
|---|---|---|---|---|---|
| 3 | 8.3604298E−05 | 2.5710606E−05 | 4.4013013E−07 | −1.7637650E−06 | −6.9677203E−07 |
| 4 | 2.3513223E−02 | 6.2682161E−03 | −1.0962071E−03 | −2.3313869E−03 | −1.6716429E−03 |
| 5 | −5.2880345E−03 | −3.0989202E−03 | −2.7339125E−03 | −1.0008128E−03 | 8.4222020E−04 |
| 6 | 1.8884538E−01 | 3.4022776E−01 | 2.1058271E−01 | −4.6238690E−02 | −4.3452606E−01 |
| 8 | −6.7075090E+00 | −1.2218420E+01 | −2.4036478E+00 | 5.4473170E+01 | 7.2387974E+01 |
| 9 | 6.0908220E−02 | 1.4939656E−02 | −4.6683745E−02 | −5.8252482E−02 | −2.8540678E−02 |

| Si | RB12 | RB13 | RB14 | RB15 | RB16 |
|---|---|---|---|---|---|
| 3 | −1.9423857E−07 | 2.0943140E−09 | 1.8539024E−08 | 6.9303654E−09 | 3.0741411E−09 |
| 4 | −8.7547306E−04 | −3.1733652E−04 | −3.6361978E−05 | 3.3568504E−05 | 7.3173384E−05 |
| 5 | 4.8007882E−04 | 1.9342859E−04 | 6.2469479E−05 | 5.7112843E−06 | −1.5668953E−05 |
| 6 | −7.7469316E−01 | −6.6642884E−01 | 3.7088131E−01 | 2.5324976E−01 | 3.7185084E+00 |
| 8 | −1.0365839E+02 | −2.4126122E+02 | −1.5879540E+02 | 1.9973356E+02 | 5.9812146E+02 |
| 9 | 1.4732444E−02 | 4.2110080E−02 | 4.3277334E−02 | 2.2254455E−02 | −8.1162316E−03 |

TABLE 2-continued

Example 1 Aspheric Surface Data

| Si | RB17 | RB18 | RB19 | RB20 |
| --- | --- | --- | --- | --- |
| 3 | −2.2561656E−10 | −3.1765557E−10 | −8.7958402E−11 | 2.7552704E−11 |
| 4 | 5.2970863E−05 | 2.2254597E−05 | −4.7208128E−06 | −7.6346136E−06 |
| 5 | −2.7331531E−05 | −3.7960909E−05 | −5.6460859E−06 | 1.1640230E−05 |
| 6 | −1.5256084E+00 | 3.0435349E+00 | −1.0297627E+01 | 5.8668040E+00 |
| 8 | 1.8496308E+03 | 3.2293289E+02 | −9.1486931E+03 | 6.7570017E+03 |
| 9 | −3.3526222E−02 | −3.9472904E−02 | −1.8951891E−02 | 4.7534705E−02 |

TABLE 3

Example 1 Data of Radius of Curvature

| Si | Effective Diameter Edge | | Ratio of Effective Diameter Edge To Center | |
| --- | --- | --- | --- | --- |
| 3 | \|RX3\| | 25.99 | \|RX3\|/\|R3\| | 11.28 |
| 4 | \|RX4\| | 2.00 | \|RX4\|/\|R4\| | 0.80 |
| 5 | \|RX5\| | 1.87 | \|RX5\|/\|R5\| | 0.97 |
| 6 | \|RX6\| | 93.31 | \|RX6\|/\|R6\| | 3.47 |
| 8 | \|RX8\| | 4.12 | \|RX8\|/\|R8\| | 0.56 |
| 9 | \|RX9\| | 1.23 | \|RX9\|/\|R9\| | 1.52 |

TABLE 4

Example 2 Lens Data / Example 2 Various Data

| Si | Ri | Di | Ndj | vdj | | |
| --- | --- | --- | --- | --- | --- | --- |
| 1 | 19.0625 | 1.8000 | 1.77250 | 49.6 | Fno. | 2.8 |
| 2 | 4.3925 | 2.7261 | | | 2ω | 200.2 |
| 3* | −2.4549 | 1.2000 | 1.53389 | 56.0 | Bf | 1.80 |
| 4* | 2.4046 | 0.7001 | | | L | 12.49 |
| 5* | 1.9999 | 2.2307 | 1.61396 | 25.5 | ED1 | 14.82 |
| 6* | −60.3967 | 0.3393 | | | f | 0.69 |
| 7 (Aperture Diaphragm) | ∞ | 0.1900 | | | f1 | −7.81 |
| 8* | −7.6665 | 1.5000 | 1.53389 | 56.0 | f2 | −2.10 |
| 9* | −0.8222 | 0.8000 | | | f3 | 3.20 |
| 10 | ∞ | 0.5000 | 1.51680 | 64.2 | f4 | 1.60 |
| 11 | ∞ | 0.6752 | | | f12 | −1.29 |
| Image Plane | ∞ | | | | f34 | 2.70 |
| | | | | | f23 | 27471.06 |

TABLE 5

Example 2 Aspheric Surface Data

| Si | KA | RB3 | RB4 | RB5 | RB6 |
| --- | --- | --- | --- | --- | --- |
| 3 | 0.0000000E+00 | 1.1757190E−01 | −1.8551506E−02 | −1.2025746E−03 | 8.6404028E−05 |
| 4 | 0.0000000E+00 | 6.3769178E−02 | 8.6648548E−02 | −8.0657306E−02 | 3.0104780E−02 |
| 5 | 0.0000000E+00 | 4.6981247E−02 | −7.7010627E−02 | 9.8728819E−02 | 3.1942879E−03 |
| 6 | 0.0000000E+00 | −8.4458739E−02 | 4.1379635E−01 | −3.8817942E−01 | −1.6430125E−01 |
| 8 | 0.0000000E+00 | 2.6678511E−02 | −3.1355765E−01 | −1.0184760E+00 | 6.3304116E+00 |
| 9 | 0.0000000E+00 | 1.1681251E−02 | −3.7699816E−02 | −3.6727182E−03 | −3.4408756E−02 |

| Si | RB7 | RB8 | RB9 | RB10 | RB11 |
| --- | --- | --- | --- | --- | --- |
| 3 | 8.2049031E−05 | 2.5309874E−05 | 3.4523428E−07 | −1.7853785E−06 | −7.0165814E−07 |
| 4 | 2.3565125E−02 | 6.2949837E−03 | −1.0835414E−03 | −2.3258666E−03 | −1.6695080E−03 |
| 5 | −5.3324442E−03 | −3.0984317E−03 | −2.7207006E−03 | −9.8681020E−04 | 8.5336079E−04 |
| 6 | 1.9216480E−01 | 3.4583174E−01 | 2.1848741E−01 | −3.6426196E−02 | −4.2359051E−01 |
| 8 | −6.7153776E+00 | −1.2225635E+01 | −2.4153343E+00 | 5.4453816E+01 | 7.2346964E+01 |
| 9 | 6.2035163E−02 | 1.6190216E−02 | −4.5604622E−02 | −5.7448893E−02 | −2.8032226E−02 |

| Si | RB12 | RB13 | RB14 | RB15 | RB16 |
| --- | --- | --- | --- | --- | --- |
| 3 | −1.9534648E−07 | 1.8425835E−09 | 1.8483791E−08 | 6.9198988E−09 | 3.0731742E−09 |
| 4 | −8.7483952E−04 | −3.1731163E−04 | −3.6545098E−05 | 3.3344804E−05 | 7.2971137E−05 |
| 5 | 4.8787374E−04 | 1.9843812E−04 | 6.5457633E−05 | 7.3481955E−06 | −1.4880136E−05 |
| 6 | −7.6387719E−01 | −6.5763223E−01 | 3.7471277E−01 | 2.4745337E−01 | 3.6957575E+00 |
| 8 | −1.0330641E+02 | −2.4345690E+02 | −1.6303369E+02 | 1.9796159E+02 | 6.2703007E+02 |
| 9 | 1.4963584E−02 | 4.2097441E−02 | 4.3060065E−02 | 2.1872333E−02 | −8.6249903E−03 |

| Si | RB17 | RB18 | RB19 | RB20 |
| --- | --- | --- | --- | --- |
| 3 | −2.2505141E−10 | −3.1714271E−10 | −8.7665376E−11 | 2.7695848E−11 |
| 4 | 5.2807135E−05 | 2.2128979E−05 | −4.8143597E−06 | −7.7030265E−06 |
| 5 | −2.7043636E−05 | −3.7948358E−05 | −5.7694720E−06 | 1.1462808E−05 |
| 6 | −1.5758514E+00 | 3.0410649E+00 | −1.0276964E+01 | 5.8453232E+00 |
| 8 | 1.8333531E+03 | 3.2248433E+02 | −9.1486624E+03 | 6.7570094E+03 |
| 9 | −3.4125963E−02 | −4.0130080E−02 | −1.9341681E−02 | 4.7262966E−02 |

TABLE 6

Example 2 Data of Radius of Curvature

| Si | Effective Diameter Edge | | Ratio of Effective Diameter Edge To Center | |
|---|---|---|---|---|
| 3 | \|RX3\| | 59.40 | \|RX3\|/\|R3\| | 24.20 |
| 4 | \|RX4\| | 2.01 | \|RX4\|/\|R4\| | 0.84 |
| 5 | \|RX5\| | 1.81 | \|RX5\|/\|R5\| | 0.91 |
| 6 | \|RX6\| | 10.72 | \|RX6\|/\|R6\| | 0.18 |
| 8 | \|RX8\| | 3.79 | \|RX8\|/\|R8\| | 0.49 |
| 9 | \|RX9\| | 1.22 | \|RX9\|/\|R9\| | 1.48 |

TABLE 7

| Example 3 Lens Data | | | | | Example 3 Various Data | |
|---|---|---|---|---|---|---|
| Si | Ri | Di | Ndj | νdj | Fno. | 2.8 |
| 1 | 17.4900 | 1.2000 | 1.77250 | 49.6 | 2ω | 198.0 |
| 2 | 3.9435 | 2.4900 | | | Bf | 2.74 |
| 3* | −2.6335 | 1.1000 | 1.53389 | 56.0 | L | 12.56 |
| 4* | 2.6663 | 0.7800 | | | ED1 | 12.28 |
| 5* | 2.4573 | 2.1500 | 1.61396 | 25.5 | f | 0.87 |
| 6* | 65.5898 | 0.4500 | | | f1 | −6.86 |
| 7 (Aperture Diaphragm) | ∞ | 0.1500 | | | f2 | −2.31 |
| 8* | −3.7962 | 1.5000 | 1.53389 | 56.0 | f3 | 4.10 |
| 9* | −0.9741 | 1.1640 | | | f4 | 2.07 |
| 10 | ∞ | 0.6000 | 1.51680 | 64.2 | f12 | −1.35 |
| 11 | ∞ | 1.1800 | | | f34 | 2.74 |
| Image Plane | ∞ | | | | f23 | −13.10 |

TABLE 8

Example 3 Aspheric Surface Data

| Si | KA | RB3 | RB4 | RB5 | RB6 |
|---|---|---|---|---|---|
| 3 | 0.0000000E+00 | 1.1747109E−01 | −1.9018252E−02 | −1.3844296E−03 | 4.8501857E−05 |
| 4 | 0.0000000E+00 | 8.1172341E−02 | 8.8732724E−02 | −8.0510691E−02 | 2.9557254E−02 |
| 5 | 0.0000000E+00 | 7.0856743E−02 | −8.8535510E−02 | 9.6198743E−02 | 3.5582338E−03 |
| 6 | 0.0000000E+00 | −8.4280868E−02 | 3.9962618E−02 | −3.9119366E−01 | −1.5156699E−01 |
| 8 | 0.0000000E+00 | −2.1173061E−02 | −1.3823737E−01 | −1.1399805E+00 | 5.9746751E+00 |
| 9 | 0.0000000E+00 | 1.8546373E−02 | −6.8889899E−02 | −9.2800629E−03 | −3.6351424E−02 |

| Si | RB7 | RB8 | RB9 | RB10 | RB11 |
|---|---|---|---|---|---|
| 3 | 7.6617494E−05 | 2.4987325E−05 | 4.7265381E−07 | −1.7246970E−06 | −6.7736176E−07 |
| 4 | 2.3190165E−02 | 6.1250327E−03 | −1.1468235E−03 | −2.3468087E−03 | −1.6750249E−03 |
| 5 | −4.7992996E−03 | −2.8122882E−03 | −2.6164186E−03 | −9.6843377E−04 | 8.4258940E−04 |
| 6 | 2.1357603E−01 | 3.6326261E−01 | 2.2137766E−01 | −5.1534829E−01 | −4.5406833E−01 |
| 8 | −7.0038570E+00 | −1.2012259E+01 | −1.2940092E+00 | 5.6628258E+01 | 7.5191307E+01 |
| 9 | 6.1536486E−02 | 1.7377767E−02 | −4.3074747E−02 | −5.4358771E−02 | −2.5234064E−02 |

| Si | RB12 | RB13 | RB14 | RB15 | RB16 |
|---|---|---|---|---|---|
| 3 | −1.8981728E−07 | 3.4595852E−09 | 1.9021957E−08 | 7.0225147E−09 | 3.0934273E−09 |
| 4 | −8.7706143E−04 | −3.1791157E−04 | −3.7082830E−05 | 3.3242871E−05 | 7.2742731E−05 |
| 5 | 4.7399626E−04 | 1.8967481E−04 | 6.2450673E−05 | 8.0491317E−06 | −1.2407662E−05 |
| 6 | −8.0112072E−01 | −6.9085440E−01 | 3.6764029E−01 | 2.6950446E−01 | 3.7341682E+00 |
| 8 | −9.9033645E+01 | −2.8315430E+02 | −1.9405051E+02 | 1.8768774E+02 | 5.2689482E+02 |
| 9 | 1.6770187E−02 | 4.2522522E−02 | 4.2028205E−02 | 1.9565977E−02 | −1.1833646E−02 |

| Si | RB17 | RB18 | RB19 | RB20 |
|---|---|---|---|---|
| 3 | −2.2185989E−10 | −3.1821893E−10 | −8.9128124E−11 | 2.6496924E−11 |
| 4 | 5.2719259E−05 | 2.2188352E−05 | −4.4704606E−06 | −7.5111483E−06 |
| 5 | −2.4495707E−05 | −3.6144366E−05 | −5.5300450E−06 | 1.0664779E−05 |
| 6 | −1.5058683E+00 | 3.0929629E+00 | −1.0260925E+01 | 5.7524184E+00 |
| 8 | 2.0133402E+03 | 9.8134027E+02 | −8.0552025E+03 | 4.7259112E+03 |
| 9 | −3.7769518E−02 | −4.3712422E−02 | −1.7711454E−02 | 4.9576935E−02 |

TABLE 9

Example 3 Data of Radius of Curvature

| Si | Effective Diameter Edge | | Ratio of Effective Diameter Edge To Center | |
|---|---|---|---|---|
| 3 | \|RX3\| | 31.55 | \|RX3\|/\|R3\| | 11.98 |
| 4 | \|RX4\| | 1.91 | \|RX4\|/\|R4\| | 0.72 |
| 5 | \|RX5\| | 1.81 | \|RX5\|/\|R5\| | 0.74 |
| 6 | \|RX6\| | 8.77 | \|RX6\|/\|R6\| | 0.13 |
| 8 | \|RX8\| | 2.21 | \|RX8\|/\|R8\| | 0.58 |
| 9 | \|RX9\| | 1.22 | \|RX9\|/\|R9\| | 1.25 |

TABLE 10

| Example 4 Lens Data | | | | | Example 4 Various Data | |
|---|---|---|---|---|---|---|
| Si | Ri | Di | Ndj | νdj | Fno. | 2.8 |
| 1 | 17.4889 | 1.2000 | 1.77250 | 49.6 | 2ω | 200.2 |
| 2 | 4.4805 | 2.8200 | | | Bf | 1.79 |
| 3* | −2.4536 | 1.2000 | 1.53389 | 56.0 | L | 11.96 |
| 4* | 2.4071 | 0.7000 | | | ED1 | 13.67 |
| 5* | 1.9993 | 2.2000 | 1.61396 | 25.5 | f | 0.69 |
| 6* | −59.6565 | 0.3600 | | | f1 | −8.12 |
| 7 (Aperture Diaphragm) | ∞ | 0.1900 | | | f2 | −2.10 |
| 8* | −7.5645 | 1.5000 | 1.53389 | 56.0 | f3 | 3.19 |
| 9* | −0.8191 | 0.8000 | | | f4 | 1.60 |
| 10 | ∞ | 0.7000 | 1.51680 | 64.2 | f12 | −1.29 |
| 11 | ∞ | 0.5335 | | | f34 | 2.70 |
| Image Plane | ∞ | | | | f23 | 2103.14 |

TABLE 11

Example 4 Aspheric Surface Data

| Si | KA | RB3 | RB4 | RB5 | RB6 |
|---|---|---|---|---|---|
| 3 | 0.0000000E+00 | 1.1754131E−01 | −1.8554644E−02 | −1.2026496E−03 | 8.6511136E−05 |
| 4 | 0.0000000E+00 | 6.3816592E−02 | 8.6671452E−02 | −8.0646915E−02 | 3.0109541E−02 |
| 5 | 0.0000000E+00 | 4.6865715E−02 | −7.6989182E−02 | 9.8760241E−02 | 3.2157582E−03 |
| 6 | 0.0000000E+00 | −8.4595774E−02 | 4.1368171E−01 | −3.8827856E−01 | −1.6438457E−01 |
| 8 | 0.0000000E+00 | 2.6429713E−02 | −3.1365826E−01 | −1.0187814E+00 | 6.3296832E+00 |
| 9 | 0.0000000E+00 | 1.3473496E−02 | −3.7368843E−02 | −3.5789859E−03 | −3.4374981E−02 |

| Si | RB7 | RB8 | RB9 | RB10 | RB11 |
|---|---|---|---|---|---|
| 3 | 8.2097713E−05 | 2.5325435E−05 | 3.4949573E−07 | −1.7843312E−06 | −7.0142673E−07 |
| 4 | 2.3567374E−02 | 6.2960958E−03 | −1.0829562E−03 | −2.3255360E−03 | −1.6693079E−03 |
| 5 | −5.3188753E−03 | −3.0898896E−03 | −2.7153165E−03 | −9.8342867E−04 | 8.5546635E−04 |
| 6 | 1.9211238E−01 | 3.4581893E−01 | 2.1850223E−01 | −3.6427013E−02 | −4.2368950E−01 |
| 8 | −6.7167245E+00 | −1.2227696E+01 | −2.4178195E+00 | 5.4452347E+01 | 7.2350971E+01 |
| 9 | 6.2051468E−02 | 1.6201128E−02 | −4.5595433E−02 | −5.7440327E−02 | −2.8024043E−02 |

| Si | RB12 | RB13 | RB14 | RB15 | RB16 |
|---|---|---|---|---|---|
| 3 | −1.9530253E−07 | 1.8485166E−09 | 1.8483596E−08 | 6.9193146E−09 | 3.0728604E−09 |
| 4 | −8.7471170E−04 | −3.1722701E−04 | −3.6487965E−05 | 3.3383652E−05 | 7.2997537E−05 |
| 5 | 4.8916694E−04 | 1.9921654E−04 | 6.5912224E−05 | 7.6011062E−06 | −1.4751132E−05 |
| 6 | −7.6419866E−01 | −6.5833086E−01 | 3.7349586E−01 | 2.4570051E−01 | 3.6938162E+00 |
| 8 | −1.0332212E+02 | −2.4356019E+02 | −1.6275967E+02 | 1.9892150E+02 | 6.2332533E+02 |
| 9 | 1.4971356E−02 | 4.2104690E−02 | 4.3066658E−02 | 2.1878139E−02 | −8.6200946E−03 |

| Si | RB17 | RB18 | RB19 | RB20 |
|---|---|---|---|---|
| 3 | −2.2518220E−10 | −3.1719174E−10 | −8.7682735E−11 | 2.7689906E−11 |
| 4 | 5.2824982E−05 | 2.2140953E−05 | −4.8063981E−06 | −7.6977818E−06 |
| 5 | −2.6989342E−05 | −3.7937872E−05 | −5.7835660E−06 | 1.1435958E−05 |
| 6 | −1.5767814E+00 | 3.0387842E+00 | −1.0274204E+01 | 5.8566222E+00 |
| 8 | 1.8376165E+03 | 3.2222491E+02 | −9.1486624E+03 | 6.7570094E+03 |
| 9 | −3.4122089E−02 | −4.0127328E−02 | −1.9223795E−02 | 4.7235463E−02 |

TABLE 12

Example 4 Data of Radius of Curvature

| Si | Effective Diameter Edge | | Ratio of Effective Diameter Edge To Center | |
|---|---|---|---|---|
| 3 | |RX3| | 55.63 | |RX3|/|R3| | 22.67 |
| 4 | |RX4| | 2.02 | |RX4|/|R4| | 0.84 |
| 5 | |RX5| | 1.82 | |RX5|/|R5| | 0.91 |
| 6 | |RX6| | 11.84 | |RX6|/|R6| | 0.20 |
| 8 | |RX8| | 3.75 | |RX8|/|R8| | 0.50 |
| 9 | |RX9| | 1.22 | |RX9|/|R9| | 1.49 |

TABLE 13

| Example 5 Lens Data | | | | | Example 5 Various Data | |
|---|---|---|---|---|---|---|
| Si | Ri | Di | Ndj | νdj | Fno. | 2.8 |
| 1 | 17.1840 | 1.7800 | 1.75500 | 52.3 | 2ω | 199.8 |
| 2 | 4.1645 | 2.7800 | | | Bf | 1.79 |
| 3* | −2.3197 | 1.1500 | 1.53389 | 56.0 | L | 12.49 |
| 4* | 2.4092 | 0.5500 | | | ED1 | 14.52 |
| 5* | 1.8597 | 2.4700 | 1.61396 | 25.5 | f | 0.70 |
| 6* | −30.2305 | 0.2420 | | | f1 | −7.74 |
| 7 (Aperture Diaphragm) | ∞ | 0.2310 | | | f2 | −2.04 |
| 8* | −5.8076 | 1.5000 | 1.53389 | 56.0 | f3 | 2.94 |
| 9* | −0.8014 | 0.4324 | | | f4 | 1.58 |
| 10 | ∞ | 0.5000 | 1.51680 | 64.2 | f12 | −1.26 |
| 11 | ∞ | 1.0277 | | | f34 | 3.03 |
| Image Plane | ∞ | | | | f23 | 63.19 |

TABLE 14

Example 5 Aspheric Surface Data

| Si | KA | RB3 | RB4 | RB5 | RB6 |
|---|---|---|---|---|---|
| 3 | 0.0000000E+00 | 1.1592772E−01 | −1.8580954E−02 | −1.1807897E−03 | 9.4970101E−05 |
| 4 | 0.0000000E+00 | 6.5294993E−02 | 8.6769754E−02 | −8.0739372E−02 | 3.0029876E−02 |
| 5 | 0.0000000E+00 | 4.8561472E−02 | −7.6579410E−02 | 9.8944817E−02 | 3.2602488E−03 |
| 6 | 0.0000000E+00 | −9.7279866E−02 | 4.1069299E−01 | −3.8981829E−01 | −1.6576275E−01 |
| 8 | 0.0000000E+00 | 6.2953243E−02 | −3.1000363E−01 | −1.0178990E+00 | 6.3261200E+00 |
| 9 | 0.0000000E+00 | 1.0428072E−02 | −2.5858787E−02 | −5.9251176E−04 | −3.4336347E−02 |

TABLE 14-continued

Example 5 Aspheric Surface Data

| Si | RB7 | RB8 | RB9 | RB10 | RB11 |
|---|---|---|---|---|---|
| 3 | 8.3493801E−05 | 2.5530700E−05 | 3.2864695E−07 | −1.7330881E−06 | −6.9990336E−07 |
| 4 | 2.3521339E−02 | 6.2710849E−03 | −1.0949852E−03 | −2.3306055E−03 | −1.6710488E−03 |
| 5 | −5.3309016E−03 | −3.1159616E−03 | −2.7416004E−03 | −1.0047283E−03 | 8.3999048E−04 |
| 6 | 1.8965623E−01 | 3.4110376E−01 | 2.1053746E−01 | −4.8565687E−02 | −4.4080305E−01 |
| 8 | −6.7160840E+00 | −1.2231443E+01 | −2.4101454E+00 | 5.4500074E+01 | 7.2510935E+01 |
| 9 | 6.1185540E−02 | 1.5202765E−02 | −4.6420695E−02 | −5.7981896E−02 | −2.8257217E−02 |

| Si | RB12 | RB13 | RB14 | RB15 | RB16 |
|---|---|---|---|---|---|
| 3 | −1.9429388E−07 | 2.0918435E−09 | 1.8588603E−08 | 6.9534638E−09 | 3.0885577E−09 |
| 4 | −8.7500266E−04 | −3.1697201E−04 | −3.6028019E−05 | 3.3757940E−05 | 7.3298405E−05 |
| 5 | 4.7870932E−04 | 1.9256837E−04 | 6.1938246E−05 | 5.3989964E−06 | −1.5834222E−05 |
| 6 | −7.8660830E−01 | −6.8519914E−01 | 3.4510606E−01 | 2.2118152E−01 | 3.6816461E+00 |
| 8 | −1.0334010E+02 | −2.3993627E+02 | −1.5236374E+02 | 1.9538575E+02 | 5.9333916E+02 |
| 9 | 1.5032386E−02 | 4.2428936E−02 | 4.3616649E−02 | 2.2615111E−02 | −7.7338849E−03 |

| Si | RB17 | RB18 | RB19 | RB20 |
|---|---|---|---|---|
| 3 | −2.2464206E−10 | −3.1972554E−10 | −8.8587339E−11 | 2.7418346E−11 |
| 4 | 5.3047189E−05 | 2.2295413E−05 | −4.7047470E−06 | −7.6348384E−06 |
| 5 | −2.7398635E−05 | −3.7963296E−05 | −5.6068019E−06 | 1.1705195E−05 |
| 6 | −1.5651690E+00 | 3.1111953E+00 | −1.0176141E+01 | 5.9111779E+00 |
| 8 | 1.8623821E+03 | 3.2296409E+02 | −9.1486624E+03 | 6.7570094E+03 |
| 9 | −3.3122188E−02 | −3.9046725E−02 | −1.9703745E−02 | 4.7042778E−02 |

TABLE 15

Example 5 Data of Radius of Curvature

| Si | Effective Diameter Edge | | Ratio of Effective Diameter Edge To Center | |
|---|---|---|---|---|
| 3 | \|RX3\| | 25.98 | \|RX3\|/\|R3\| | 11.20 |
| 4 | \|RX4\| | 1.85 | \|RX4\|/\|R4\| | 0.77 |
| 5 | \|RX5\| | 1.76 | \|RX5\|/\|R5\| | 0.95 |
| 6 | \|RX6\| | 82.56 | \|RX6\|/\|R6\| | 2.73 |
| 8 | \|RX8\| | 5.05 | \|RX8\|/\|R8\| | 0.87 |
| 9 | \|RX9\| | 1.24 | \|RX9\|/\|R9\| | 1.55 |

In all the imaging lenses according to Examples 1 to 5, the first lens L1 is a spherical glass lens, but one surface or both surfaces of the first lens L1 may be used as aspheric surfaces. By forming the first lens L1 as the aspheric glass lens, it is possible to correct aberrations yet more satisfactorily.

Further, in the imaging lens according to Examples 1 to 5, all of the second lens L2, the third lens L3, and the fourth lens L4 are made of plastic, and can be manufactured at low cost.

Table 16 shows values corresponding to Conditional Expressions (1) to (14) in the imaging lenses according to Examples 1 to 5. In Examples 1 to 5, the d-line is set as a reference wavelength, and the values at the reference wavelength are shown in Table 16.

TABLE 16

| | Conditional Expression | | | | | | |
|---|---|---|---|---|---|---|---|
| Example | (1) (R3 + R4)/(R3 − R4) | (2) D3/f | (3) D1/f | (4) ED1/R1 | (5) D2/f | (6) \|f12/f34\| | (7) (D4 + D5)/f |
| 1 | −0.04 | 1.63 | 2.56 | 0.82 | 3.94 | 0.43 | 4.19 |
| 2 | 0.01 | 1.73 | 2.60 | 0.78 | 3.94 | 0.48 | 4.24 |
| 3 | −0.01 | 1.27 | 1.38 | 0.70 | 2.87 | 0.49 | 3.38 |
| 4 | 0.01 | 1.74 | 1.74 | 0.78 | 4.09 | 0.48 | 4.21 |
| 5 | −0.02 | 1.63 | 2.53 | 0.85 | 3.95 | 0.42 | 4.29 |

| | Conditional Expression | | | | | | |
|---|---|---|---|---|---|---|---|
| Example | (8) L/f | (9) Bf/f | (10) (R8 − R9)/(R8 + R9) | (11) R8/f | (12) L/f34 | (13) D5/f | (14) (R1 − R2)/(R1 + R2) |
| 1 | 17.75 | 2.53 | 0.80 | −10.37 | 4.19 | 3.45 | 0.61 |
| 2 | 18.06 | 2.61 | 0.81 | −11.08 | 4.62 | 3.23 | 0.63 |
| 3 | 14.48 | 3.16 | 0.59 | −4.38 | 4.58 | 2.48 | 0.63 |
| 4 | 17.37 | 2.61 | 0.80 | −10.98 | 4.42 | 3.19 | 0.59 |
| 5 | 17.74 | 2.54 | 0.76 | −8.25 | 4.13 | 3.51 | 0.61 |

FIGS. 8(A) to 8(E) show aberration diagrams of the imaging lens according to Example 1. FIGS. 8(A) to 8(D) are aberration diagrams of vertical aberrations, and respectively show spherical aberration, astigmatism, distortion (distortion aberration), and lateral chromatic aberration (magnification chromatic aberration). FIG. 8(E) shows aberration diagrams of lateral aberration (including comatic aberration) by collecting five aberration diagrams in the tangential and sagittal directions at the respective half angles of view. Each of the aberration diagrams shows aberration in which the d-line (587.56 nm) is set as a reference wavelength. The spherical aberration diagrams and the lateral chromatic aberration diagrams show aberrations at the F-line (a wavelength of 486.13 nm), the C-line (a wavelength of 656.27 nm), and the s-line (a wavelength of 852.11 nm). The Fno. in the spherical aberration diagram represents an F number, the ω in other diagrams represents a half angle of view. In addition, each aberration diagram of distortion shows the deviation from the ideal image height expressed by $2f \times \tan(\phi/2)$, where f is the focal length of the whole system and $\phi$ (assumed as a variable, $0 \leq \phi \leq \omega$) is the half angle of view.

Likewise, FIGS. 9(A) to 9(E), FIGS. 10(A) to 10(E), FIGS. 11(A) to 11(E), and FIGS. 12(A) to 12(E) respectively show aberration diagrams of spherical aberrations, astigmatism, distortions (distortion aberration), lateral chromatic aberrations (magnification chromatic aberration), and lateral aberrations of the imaging lenses according to Examples 2 to 5. As can be seen from the aberration diagrams, the aberrations in Examples 1 to 5 are satisfactorily corrected in the visible part and the near-infrared part of the spectrum.

As described above, each of the imaging lenses according to Examples 1 to 5 has a small number of lenses, for example, four lenses, and is made of plastic, and thus it is possible to manufacture the lens with a small size and low costs. In addition, the imaging lenses are configured so that the total angle of view is a wide angle of 200 degrees or more, and thus has a small F number of 2.8 and has a favorable optical performance by satisfactorily correcting the aberrations including field curvature, distortion, and lateral chromatic aberration. These imaging lenses are applicable to surveillance cameras, on-board cameras for taking a picture of the front, the side, and the rear of a vehicle, and the like.

Embodiment of Imaging Apparatus

Figure 13:
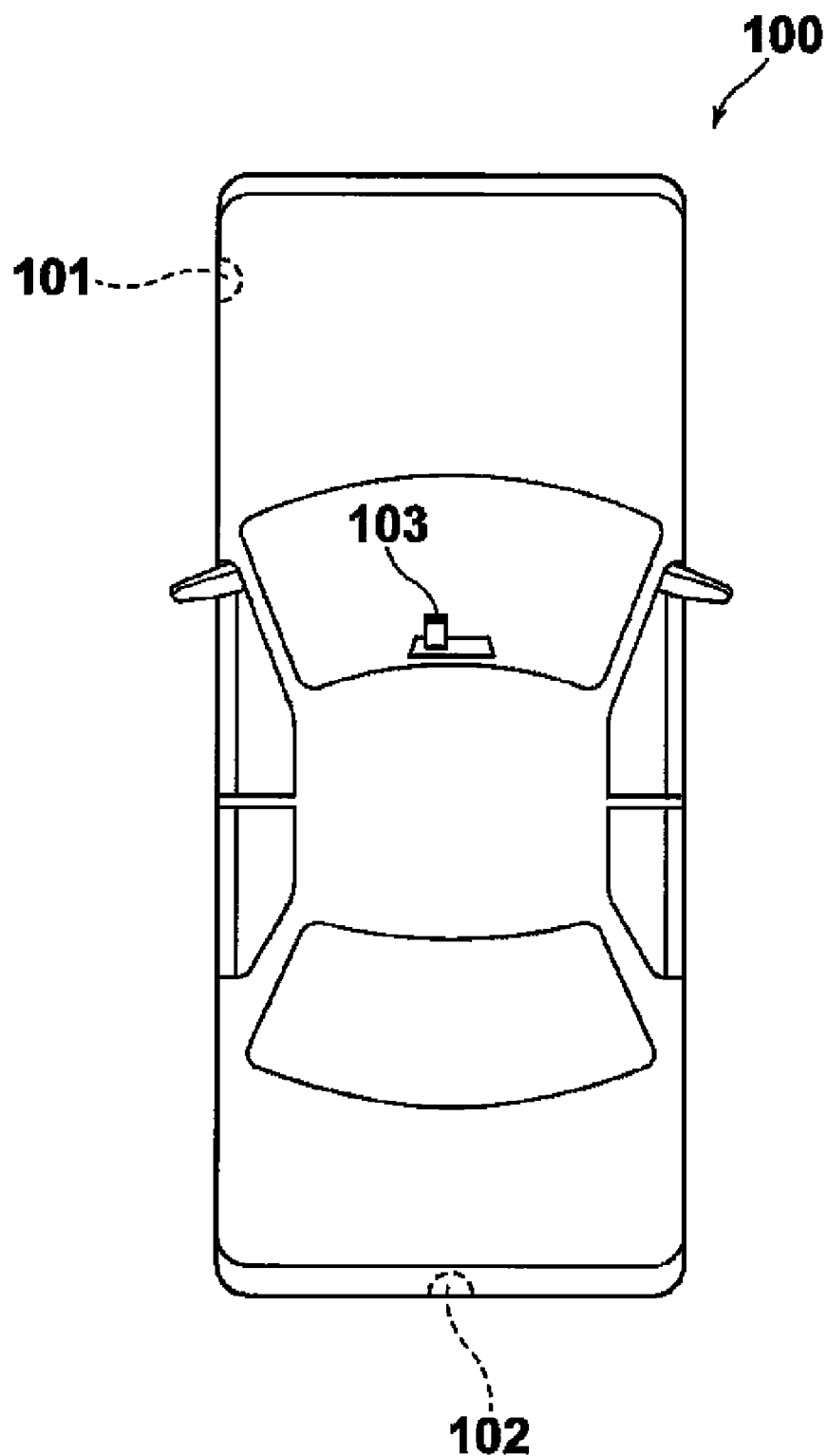
FIG. 13 is a diagram illustrating an arrangement of an on-board imaging apparatus according to an exemplary embodiment of the invention.

FIG. 13 shows, as an example in use, a feature of a vehicle 100 equipped with an imaging apparatus having the imaging lens according to the embodiment. In FIG. 13, the vehicle 100 includes an outside-vehicle camera 101 for photographing a blind spot area of the passenger seat side, an outside-vehicle camera 102 for photographing a blind spot area of the rear of the vehicle 100, and an in-vehicle camera 103 disposed on the rear of a room mirror and for photographing the same visual field range as a driver. The outside-vehicle camera 101, the outside-vehicle camera 102, and the in-vehicle camera 103 are the imaging apparatuses, and include the imaging lens according to the embodiment of the invention and the imaging device converting an optical image formed by the imaging lens into an electric signal.

The imaging lenses according to the examples of the invention have the above-mentioned advantages. Hence, it is possible to form the outside-vehicle cameras 101 and 102 and the in-vehicle camera 103 with a small size and low costs, and it is possible to obtain a fine image with a wide angle of view even in the peripheral portion of the imaging area.

The invention has been described with reference to the embodiment and the examples, but the invention is not limited to the embodiment mentioned above, and may be modified to various forms. For example, the values of a radius of curvature, an on-axis surface spacing, a refractive index, and an Abbe number of the lens components are not limited to the values noted in the numerical examples, and may have other values.

Furthermore, in the above-mentioned examples, all the lenses are made of a homogeneous material, but a gradient index lens may be used. Further, in the above-mentioned examples, the second lens L2 to the fourth lens L4 are formed as refractive lenses having aspheric surfaces, but one or more diffractive optical elements may be formed on one surface or a plurality of surfaces.

Further, in the embodiment of the imaging apparatus, the example in which the invention is applied to the on-board camera has been described with reference to the drawings, but the invention is not limited to this application, and is also applicable to, for example, a portable cellular phone camera, a surveillance camera, and the like.

What is claimed is:

1. An imaging lens comprising: in order from an object side thereof,
    a negative first lens;
    a negative second lens;
    a positive third lens;
    a stop; and
    a positive fourth lens,
    wherein
    each of the second lens, the third lens, and the fourth lens has at least one aspheric surface,
    an Abbe number of a material of the third lens at the d-line is 35 or less, and
    the following Conditional Expression (1) is satisfied:

$$-0.2 < (R3+R4)/(R3-R4) < 0.2 \quad (1)$$

wherein R3 is a paraxial radius of curvature of an object side surface of the second lens, and R4 is a paraxial radius of curvature of an image side surface of the second lens.

2. The imaging lens according to claim 1, wherein the following Conditional Expression (5) is satisfied:

$$2.0 < D2/f < 5.0 \quad (5)$$

wherein f is the focal length of the imaging lens, and D2 is an air space on an optical axis between the first lens and the second lens.

3. The imaging lens according to clam 1, wherein the following Conditional Expression (6) is satisfied:

$$0.01 < |f12/f34| < 0.5 \quad (6)$$

wherein f12 is a composite focal length of the first lens and the second lens, and f34 is a composite focal length of the third lens and the fourth lens.

4. The imaging lens according to claim 1, wherein the following Conditional Expression (7) is satisfied:

$$2.5 < (D4+D5)/f < 5.5 \quad (7)$$

wherein f is the focal length of the imaging lens, D4 is an air space on the optical axis between the second lens and the third lens, and D5 is a center thickness of the third lens.

5. The imaging lens according to claim 1, wherein the following Conditional Expression (8) is satisfied:

$$10.0 < L/f < 20.0 \quad (8)$$

wherein f is the focal length of the imaging lens, and L is a distance on the optical axis from the object side surface of the first lens to an image plane.

6. The imaging lens according to claim 1, wherein the following Conditional Expression (9) is satisfied:

$$1.5 < Bf/f < 4.0 \quad (9)$$

where
f is the focal length of the lens system, and
Bf is a distance on the optical axis from the image side surface of the fourth lens to the image plane.

7. The imaging lens according to claim 1, wherein the following Conditional Expression (10) is satisfied:

$$0.3 < (R8-R9)/(R8+R9) < 1.0 \quad (10)$$

wherein R8 is a paraxial radius of curvature of an object side surface of the fourth lens, and R9 is a paraxial radius of curvature of the image side surface of the fourth lens.

8. An imaging apparatus comprising an imaging lens according to claim 1.

9. An imaging lens comprising: in order from an object side thereof,
a negative first lens which has a meniscus shape concave toward the image side;
a second lens of which an object side surface and an image side surface are aspheric;
a positive third lens of which an object side surface is aspheric;
a stop; and
a positive fourth lens of which an image side surface is aspheric, wherein
an Abbe number of a material of the third lens at the d-line is 35 or less, and
the following Conditional Expression (2) is satisfied:

$$1.0 < D3/f < 5.0 \quad (2)$$

wherein D3 is a center thickness of the second lens, and f is a focal length of the whole system.

10. The imaging lens according to claim 9, wherein the following Conditional Expression (5) is satisfied:

$$2.0 < D2/f < 5.0 \quad (5)$$

wherein f is the focal length of the imaging lens, and D2 is an air space on an optical axis between the first lens and the second lens.

11. The imaging lens according to claim 9, wherein the following Conditional Expression (6) is satisfied:

$$0.01 < |f12/f34| < 0.5 \quad (6)$$

wherein f12 is a composite focal length of the first lens and the second lens, and f34 is a composite focal length of the third lens and the fourth lens.

12. The imaging lens according to claim 9, wherein the following Conditional Expression (7) is satisfied:

$$2.5 < (D4+D5)/f < 5.5 \quad (7)$$

wherein f is the focal length of the imaging lens, D4 is an air space on the optical axis between the second lens and the third lens, and D5 is a center thickness of the third lens.

13. The imaging lens according to claim 9, wherein the following Conditional Expression (8) is satisfied:

$$10.0 < L/f < 20.0 \quad (8)$$

wherein f is the focal length of the imaging lens, and L is a distance on the optical axis from the object side surface of the first lens to an image plane.

14. The imaging lens according to claim 9, wherein the following Conditional Expression (9) is satisfied:

$$1.5 < Bf/f < 4.0 \quad (9)$$

where
f is the focal length of the lens system, and
Bf is a distance on the optical axis from the image side surface of the fourth lens to the image plane.

15. The imaging lens according to claim 9, wherein the following Conditional Expression (10) is satisfied:

$$0.3 < (R8-R9)/(R8+R9) < 1.0 \quad (10)$$

wherein R8 is a paraxial radius of curvature of an object side surface of the fourth lens, and R9 is a paraxial radius of curvature of the image side surface of the fourth lens.

16. An imaging apparatus comprising an imaging lens according to claim 9.

17. An imaging lens comprising: in order from an object side thereof,
a negative first lens;
a negative second lens;
a positive third lens;
a stop; and
a positive fourth lens,
wherein
a center thickness of the first lens is 1.7 mm or more, and the following Conditional Expression (3) is satisfied:

$$2.5 < D1/f < 5.5 \quad (3)$$

wherein D1 is the center thickness of the first lens, and f is a focal length of the imaging lens.

18. The imaging lens according to claim 17, wherein the following Conditional Expression (5) is satisfied:

$$2.0 < D2/f < 5.0 \quad (5)$$

wherein f is the focal length of the imaging lens, and D2 is an air space on an optical axis between the first lens and the second lens.

19. The imaging lens according to clam 17, wherein the following Conditional Expression (6) is satisfied:

$$0.01 < |f12/f34| < 0.5 \quad (6)$$

wherein f12 is a composite focal length of the first lens and the second lens, and f34 is a composite focal length of the third lens and the fourth lens.

20. The imaging lens according to claim 17, wherein the following Conditional Expression (7) is satisfied:

$$2.5 < (D4+D5)/f < 5.5 \quad (7)$$

wherein f is the focal length of the imaging lens, D4 is an air space on the optical axis between the second lens and the third lens, and D5 is a center thickness of the third lens.

21. The imaging lens according to claim 17, wherein the following Conditional Expression (8) is satisfied:

$$10.0 < L/f < 20.0 \quad (8)$$

wherein f is the focal length of the imaging lens, and L is a distance on the optical axis from the object side surface of the first lens to an image plane.

22. The imaging lens according to claim 17, wherein the following Conditional Expression (9) is satisfied:

$$1.5 < Bf/f < 4.0 \quad (9)$$

where
f is the focal length of the lens system, and
Bf is a distance on the optical axis from the image side surface of the fourth lens to the image plane.

23. The imaging lens according to claim 17, wherein the following Conditional Expression (10) is satisfied:

$$0.3 < (R8-R9)/(R8+R9) < 1.0 \quad (10)$$

wherein R8 is a paraxial radius of curvature of an object side surface of the fourth lens, and R9 is a paraxial radius of curvature of the image side surface of the fourth lens.

24. An imaging apparatus comprising an imaging lens according to claim 17.

25. An imaging lens comprising: in order from an object side thereof,
- a negative first lens;
- a negative second lens;
- a positive third lens;
- a stop; and
- a positive fourth lens,
wherein
a center thickness of the first lens is 1.7 mm or more, and the following Conditional Expression (4) is satisfied:

$$0.5 < ED1/R1 < 0.95 \qquad (4)$$

wherein ED1 is an effective diameter of an object side surface of the first lens, and R1 is a radius of curvature of the object side surface of the first lens.

26. The imaging lens according to claim 25, wherein the following Conditional Expression (5) is satisfied:

$$2.0 < D2/f < 5.0 \qquad (5)$$

wherein f is the focal length of the imaging lens, and D2 is an air space on an optical axis between the first lens and the second lens.

27. The imaging lens according to clam 25, wherein the following Conditional Expression (6) is satisfied:

$$0.01 < |f12/f34| < 0.5 \qquad (6)$$

wherein f12 is a composite focal length of the first lens and the second lens, and f34 is a composite focal length of the third lens and the fourth lens.

28. The imaging lens according to claim 25, wherein the following Conditional Expression (7) is satisfied:

$$2.5 < (D4+D5)/f < 5.5 \qquad (7)$$

wherein f is the focal length of the imaging lens, D4 is an air space on the optical axis between the second lens and the third lens, and D5 is a center thickness of the third lens.

29. The imaging lens according to claim 25, wherein the following Conditional Expression (8) is satisfied:

$$10.0 < L/f < 20.0 \qquad (8)$$

wherein f is the focal length of the imaging lens, and L is a distance on the optical axis from the object side surface of the first lens to an image plane.

30. The imaging lens according to claim 25, wherein the following Conditional Expression (9) is satisfied:

$$1.5 < Bf/f < 4.0 \qquad (9)$$

where
f is the focal length of the lens system, and
Bf is a distance on the optical axis from the image side surface of the fourth lens to the image plane.

31. The imaging lens according to claim 25, wherein the following Conditional Expression (10) is satisfied:

$$0.3 < (R8-R9)/(R8+R9) < 1.0 \qquad (10)$$

wherein R8 is a paraxial radius of curvature of an object side surface of the fourth lens, and R9 is a paraxial radius of curvature of the image side surface of the fourth lens.

32. An imaging apparatus comprising an imaging lens according to claim 25.

* * * * *